US010667288B2

(12) United States Patent
Chendamarai Kannan et al.

(10) Patent No.: US 10,667,288 B2
(45) Date of Patent: May 26, 2020

(54) TECHNIQUES FOR CONFIGURING OR TRANSMITTING GRANTLESS TRANSMISSIONS ON BEAMS IN UPLINK SUBFRAMES

(71) Applicant: QUALCOMM Incorporated, San Diego, CA (US)

(72) Inventors: Arumugam Chendamarai Kannan, San Diego, CA (US); Andrei Dragos Radulescu, San Diego, CA (US); Chirag Sureshbhai Patel, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/899,257

(22) Filed: Feb. 19, 2018

(65) Prior Publication Data
US 2018/0242348 A1 Aug. 23, 2018

Related U.S. Application Data

(60) Provisional application No. 62/461,737, filed on Feb. 21, 2017.

(51) Int. Cl.
*H04W 72/12* (2009.01)
*H04W 72/04* (2009.01)
(Continued)

(52) U.S. Cl.
CPC ....... *H04W 72/1268* (2013.01); *H04L 5/0053* (2013.01); *H04W 72/042* (2013.01);
(Continued)

(58) Field of Classification Search
CPC ........... H04W 72/046; H04W 72/1284; H04W 72/1278; H04W 74/0833; H04W 74/008;
(Continued)

(56) References Cited

U.S. PATENT DOCUMENTS

2012/0113831 A1* 5/2012 Pelletier ................ H04L 5/0053
370/252
2016/0066255 A1* 3/2016 Marinier ............... H04W 48/16
370/350

(Continued)

OTHER PUBLICATIONS

CATT: "Packet Duplication in MAC", 3GPP Draft; R2-1700967, 3rd Generation Partnership Project (3GPP), Mobile Competence Centre; 650, Route Des Lucioles; F-06921 Sophia-Antipolis Cedex; France, vol. RAN WG2, No. Athens, Greece; Feb. 13, 2017-Feb. 17, 2017 Feb. 12, 2017, XP051211733, Retrieved from the Internet: URL:http://www.3gpp.org/ftp/Meetings_3GPP_SYNC/RAN2/Docs/ [retrieved on Feb. 12, 2017], 3 pages.

(Continued)

*Primary Examiner* — Marsha D Banks Harold
*Assistant Examiner* — Elton Williams
(74) *Attorney, Agent, or Firm* — Holland & Hart LLP

(57) ABSTRACT

A method for wireless communication at a user equipment (UE) includes receiving timing information and a time-frequency resource configuration for an uplink subframe; selecting at least a first set of time-frequency resources of the uplink subframe on which to transmit; and transmitting a grantless transmission on at least the first set of time-frequency resources. The time-frequency resource configuration identifies a correspondence between at least one receive beam in a set of one or more receive beams and at least one set of time-frequency resources in one or more sets of time-frequency resources of the uplink subframe. The first set of time-frequency resources is selected based at least in part on a transmit beam of the UE, a correspondence of the (Continued)

transmit beam to a receive beam in the set of one or more receive beams, and a correspondence of the receive beam to the selected first set of time-frequency resources.

33 Claims, 19 Drawing Sheets

(51) Int. Cl.
  *H04L 5/00* (2006.01)
  *H04W 74/08* (2009.01)
(52) U.S. Cl.
  CPC .......... *H04W 72/044* (2013.01); *H04L 5/005* (2013.01); *H04L 5/0007* (2013.01); *H04W 72/1289* (2013.01); *H04W 74/0808* (2013.01)
(58) Field of Classification Search
  CPC .. H04W 72/0453; H04B 7/0695; H04B 7/088
  See application file for complete search history.

(56) References Cited

U.S. PATENT DOCUMENTS

| | | | | |
|---|---|---|---|---|
| 2017/0331670 | A1* | 11/2017 | Parkvall | H04W 52/0274 |
| 2017/0373801 | A1* | 12/2017 | Bergstrom et al. | H04L 1/1812 |
| 2018/0167121 | A1* | 6/2018 | Hakola | H04B 7/0617 |
| 2018/0167979 | A1* | 6/2018 | Guo | H04W 16/28 |

OTHER PUBLICATIONS

Fujitsu: "Discussion on PRACH Configuration in NR", 3GPP Draft; R1-1608813 Discussion on PRACH Configuration in NR, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Jan. 10, 2016-Jan. 14, 2016 Oct. 9, 2016 (Oct. 9, 2016), XP051148867, Retrieved from the Internet: URL:http://www.3gpp.org/ftp/Meetings_3GPP_SYNC/RAN1/Docs/ [retrieved on Oct. 9, 2016], 5 pages.

Huawei et al., "RACH Preamble and Procedures for Unified Single and Multiple Beam Based Access", 3GPP Draft; R1-1608824, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016 Oct. 9, 2016 (Oct. 9, 2016), XP051148878, Retrieved from the Internet: URL:http://www.3gpp.org/ftp/Meetings_3GPP_SYNC/RAN1/Docs/ [retrieved on Oct. 9, 2016], 4 pages.

International Search Report and Written Opinion —PCT/US2018/018752—ISA/EPO—dated May 29, 2018.

* cited by examiner

TECHNIQUES FOR CONFIGURING OR TRANSMITTING GRANTLESS TRANSMISSIONS ON BEAMS IN UPLINK SUBFRAMES

CROSS REFERENCES

The present application for patent claims priority to U.S. Provisional Patent Application No. 62/461,737 by Chendamarai Kannan, et al., entitled "TECHNIQUES FOR CONFIGURING OR TRANSMITTING GRANTLESS TRANSMISSIONS ON BEAMS IN UPLINK SUBFRAMES," filed Feb. 21, 2017, assigned to the assignee hereof.

BACKGROUND

Field of the Disclosure

The present disclosure, for example, relates to wireless communication systems, and more particularly to techniques for configuring or transmitting grantless transmissions on beams in uplink subframes.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless multiple-access communication system may include a number of base stations, each simultaneously supporting communication for multiple communication devices, otherwise known as UEs. In a Long-Term Evolution (LTE) or LTE-Advanced (LTE-A) network, a set of one or more base stations may define an eNodeB (eNB). In a next generation, new radio (NR), millimeter wave (mmW), or 5G network, a base station may take the form of a smart radio head (or radio head (RH)) or access node controller (ANC), with a set of smart radio heads in communication with an ANC defining a gNodeB (gNB). A base station may communicate with a set of UEs on downlink channels (e.g., for transmissions from a network access device to a UE) and uplink channels (e.g., for transmissions from a UE to a network access device).

Wireless devices that operate in mmW frequency ranges, e.g., 28 GHz, 40 GHz, 60 GHz, etc. may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies.

SUMMARY

A method for wireless communication at a UE is described. The method may include receiving timing information for an uplink subframe, and receiving a time-frequency resource configuration for the uplink subframe. The time-frequency resource configuration may identify a correspondence between at least one receive beam in a set of one or more receive beams and at least one set of time-frequency resources in one or more sets of time-frequency resources of the uplink subframe. The method may also include selecting at least a first set of time-frequency resources of the uplink subframe on which to transmit. The first set of time-frequency resources may be selected based at least in part on a transmit beam of the UE, a correspondence of the transmit beam to a receive beam in the set of one or more receive beams, and a correspondence of the receive beam to the selected first set of time-frequency resources. The method may further include transmitting a grantless transmission on at least the first set of time-frequency resources.

In some examples of the method, receiving the timing information for the uplink subframe may include receiving an indication of a fixed timing of the uplink subframe, a first timing offset of the uplink subframe relative to a discovery reference signal (DRS) transmission, or a second timing offset of the uplink subframe relative to a trigger transmission. In some examples, the method may include receiving the trigger transmission in at least one of a broadcast transmission or a UE-specific transmission. In some examples, the trigger transmission may include at least a portion of the time-frequency resource configuration for the uplink subframe. In some examples, the method may include receiving a system information transmission including at least one of the timing information for the uplink subframe, or at least a portion of the time-frequency resource configuration for the uplink subframe.

In some examples of the method, the time-frequency resource configuration for the uplink subframe may further identify a correspondence between at least one transmission type and the at least one set of time-frequency resources in the one or more sets of time-frequency resources of the uplink subframe. In some examples, the first set of time-frequency resources of the uplink subframe may be further selected based at least in part on a first transmission type of the UE, and on a correspondence between the first transmission type and the first set of time-frequency resources of the uplink subframe. In some examples, the at least one transmission type may include at least one of an acknowledgement/non-acknowledgement (ACK/NACK) transmission type, a random access transmission type, a channel quality information (CQI) transmission type, a scheduling request (SR) transmission type, a sounding reference signal (SRS) transmission type, a grantless physical uplink shared channel (PUSCH) transmission type, or a combination thereof. In some examples, the correspondence between the at least one transmission type and the at least one set of time-frequency resources may be based at least in part on a first pre-allocation of different bandwidths to different transmission types, a second pre-allocation of different code division multiplexing (CDM) codes to different transmission types, a third pre-allocation of different orthogonal cover codes (OCCs) to different transmission types, or a combination thereof.

In some examples of the method, the time-frequency resource configuration for the uplink subframe may further identify a correspondence between at least one UE and the at least one set of time-frequency resources in one or more sets of time-frequency resources of the uplink subframe. In some examples, the first set of time-frequency resources of the uplink subframe may be further selected based at least in part on the UE, and on a correspondence between the UE and the first set of time-frequency resources of the uplink subframe. In some examples, the method may include performing a Listen Before Talk (LBT) procedure prior to the transmitting. In some examples, the LBT procedure may be performed at least one of: for at least one beam direction and prior to all of the one or more sets of time-frequency resources corresponding to the one or more receive beams, for all beam directions and prior to all of the one or more sets of time-frequency resources corresponding to the one or more receive beams, or for at least the transmit beam or the receive beam and in a LBT gap prior to the first set of time-frequency resources. In some examples, the method may include selecting a type of the LBT procedure based at least in part on a transmission type.

In some examples, the method may include determining, based at least in part on a transmission type, whether to perform a LBT procedure prior to the transmitting. In some examples, the uplink subframe may include a multi-beam subframe, and the correspondence between the at least one receive beam and the at least one set of time-frequency resources includes a correspondence between a plurality of receive beams and a plurality of sets of time-frequency resources. In some examples, the time-frequency resource configuration may identify at least one of a first timing of a first LBT gap associated with more than one receive beam, a second timing of a second LBT gap associated with a single receive beam, a transmission start time associated with at least one of the plurality of receive beams, or a combination thereof. In some examples, the uplink subframe may include a single-beam subframe, and the correspondence between the at least one receive beam and the at least one set of time-frequency resources includes a correspondence between a single receive beam and a single set of time-frequency resources. In some examples, the timing information for the uplink subframe may include an indication of a time window in which the uplink subframe is to be transmitted. In some examples, the method may include receiving a trigger transmission on the receive beam during the time window, and the timing information for the uplink subframe may be relative to the trigger transmission.

In one example, an apparatus for wireless communication at a UE is described. The apparatus may include means for receiving timing information for an uplink subframe and a time-frequency resource configuration for the uplink subframe. The time-frequency resource configuration may identify a correspondence between at least one receive beam in a set of one or more receive beams and at least one set of time-frequency resources in one or more sets of time-frequency resources of the uplink subframe. The apparatus may also include means for selecting at least a first set of time-frequency resources of the uplink subframe on which to transmit. The first set of time-frequency resources may be selected based at least in part on a transmit beam of the UE, a correspondence of the transmit beam to a receive beam in the set of one or more receive beams, and a correspondence of the receive beam to the selected first set of time-frequency resources. The apparatus may further include means for transmitting a grantless transmission on at least the first set of time-frequency resources.

In some examples of the apparatus, the means for receiving the timing information for the uplink subframe may include means for receiving an indication of a fixed timing of the uplink subframe, a first timing offset of the uplink subframe relative to a DRS transmission, or a second timing offset of the uplink subframe relative to a trigger transmission. In some examples, the apparatus may include means for receiving the trigger transmission in at least one of a broadcast transmission or a UE-specific transmission. In some examples, the trigger transmission may include at least a portion of the time-frequency resource configuration for the uplink subframe. In some examples, the apparatus may include means for receiving a system information transmission including at least one of the timing information for the uplink subframe, or at least a portion of the time-frequency resource configuration for the uplink subframe.

In some examples of the apparatus, the time-frequency resource configuration for the uplink subframe may further identify a correspondence between at least one transmission type and the at least one set of time-frequency resources in the one or more sets of time-frequency resources of the uplink subframe. In some examples, the first set of time-frequency resources of the uplink subframe may be further selected based at least in part on a first transmission type of the UE, and on a correspondence between the first transmission type and the first set of time-frequency resources of the uplink subframe. In some examples, the at least one transmission type may include at least one of an ACK/NACK transmission type, a random access transmission type, a CQI transmission type, a SR transmission type, a SRS transmission type, a grantless PUSCH transmission type, or a combination thereof. In some examples, the correspondence between the at least one transmission type and the at least one set of time-frequency resources may be based at least in part on a first pre-allocation of different bandwidths to different transmission types, a second pre-allocation of different CDM codes to different transmission types, a third pre-allocation of different OCCs to different transmission types, or a combination thereof.

In some examples of the apparatus, the time-frequency resource configuration for the uplink subframe may further identify a correspondence between at least one UE and the at least one set of time-frequency resources in one or more sets of time-frequency resources of the uplink subframe. In some examples, the first set of time-frequency resources of the uplink subframe may be further selected based at least in part on the UE, and on a correspondence between the UE and the first set of time-frequency resources of the uplink subframe. In some examples, the apparatus may include means for performing a LBT procedure prior to the transmitting. In some examples, the LBT procedure may be performed at least one of: for at least one beam direction and prior to all of the one or more sets of time-frequency resources corresponding to the one or more receive beams, for all beam directions and prior to all of the one or more sets of time-frequency resources corresponding to the one or more receive beams, or for at least the transmit beam or the receive beam and in a LBT gap prior to the first set of time-frequency resources. In some examples, the apparatus may include means for selecting a type of the LBT procedure based at least in part on a transmission type.

In some examples, the apparatus may include means for determining, based at least in part on a transmission type, whether to perform a LBT procedure prior to the transmitting. In some examples, the uplink subframe may include a multi-beam subframe, and the correspondence between the at least one receive beam and the at least one set of time-frequency resources may include a correspondence between a plurality of receive beams and a plurality of sets of time-frequency resources. In some examples, the time-frequency resource configuration may identify at least one of a first timing of a first LBT gap associated with more than one receive beam, a second timing of a second LBT gap associated with a single receive beam, a transmission start time associated with at least one of the plurality of receive beams, or a combination thereof. In some examples, the uplink subframe may include a single-beam subframe, and the correspondence between the at least one receive beam and the at least one set of time-frequency resources may include a correspondence between a single receive beam and a single set of time-frequency resources. In some examples, the timing information for the uplink subframe may include an indication of a time window in which the uplink subframe is to be transmitted. In some examples, the apparatus may include means for receiving a trigger transmission on the receive beam during the time window, and the timing information for the uplink subframe may be relative to the trigger transmission.

In one example, another apparatus for wireless communication at a UE is described. The apparatus may include a processor, memory in electronic communication with the processor, and instructions stored in the memory. The instructions may be executable by the processor to receive timing information for an uplink subframe and a time-frequency resource configuration for the uplink subframe. The time-frequency resource configuration may identify a correspondence between at least one receive beam in a set of one or more receive beams and at least one set of time-frequency resources in one or more sets of time-frequency resources of the uplink subframe. The instructions may also be executable by the processor to select at least a first set of time-frequency resources of the uplink subframe on which to transmit. The first set of time-frequency resources may be selected based at least in part on a transmit beam of the UE, a correspondence of the transmit beam to a receive beam in the set of one or more receive beams, and a correspondence of the receive beam to the selected first set of time-frequency resources. The instructions may be further executable by the processor to transmit a grantless transmission on at least the first set of time-frequency resources.

In some examples, the instructions executable by the processor to receive the timing information for the uplink subframe may include instructions executable by the processor to receive an indication of a fixed timing of the uplink subframe, a first timing offset of the uplink subframe relative to a DRS transmission, or a second timing offset of the uplink subframe relative to a trigger transmission. In some examples, the instructions may be executable by the processor to receive a system information transmission including at least one of the timing information for the uplink subframe, or at least a portion of the time-frequency resource configuration for the uplink subframe. In some examples, the time-frequency resource configuration for the uplink subframe may further identify a correspondence between at least one transmission type and the at least one set of time-frequency resources in the one or more sets of time-frequency resources of the uplink subframe. In some examples, the time-frequency resource configuration for the uplink subframe may further identify a correspondence between at least one UE and the at least one set of time-frequency resources in one or more sets of time-frequency resources of the uplink subframe.

In some examples of the apparatus, the uplink subframe may include a multi-beam subframe, and the correspondence between the at least one receive beam and the at least one set of time-frequency resources may include a correspondence between a plurality of receive beams and a plurality of sets of time-frequency resources. In some examples, the time-frequency resource configuration may identify at least one of a first timing of a first LBT gap associated with more than one receive beam, a second timing of a second LBT gap associated with a single receive beam, a transmission start time associated with at least one of the plurality of receive beams, or a combination thereof. In some examples, the uplink subframe may include a single-beam subframe, and the correspondence between the at least one receive beam and the at least one set of time-frequency resources may include a correspondence between a single receive beam and a single set of time-frequency resources. In some examples, the timing information for the uplink subframe may include an indication of a time window in which the uplink subframe is to be transmitted. In some examples, the instructions may be executable by the processor to receive a trigger transmission on the receive beam during the time window, and the timing information for the uplink subframe may be relative to the trigger transmission.

In one example, a non-transitory computer-readable medium storing code for wireless communication at a UE is described. The code may include instructions executable to receive timing information for an uplink subframe and a time-frequency resource configuration for the uplink subframe. The time-frequency resource configuration may identify a correspondence between at least one receive beam in a set of one or more receive beams and at least one set of time-frequency resources in one or more sets of time-frequency resources of the uplink subframe. The instructions may also be executable to select at least a first set of time-frequency resources of the uplink subframe on which to transmit. The first set of time-frequency resources may be selected based at least in part on a transmit beam of the UE, a correspondence of the transmit beam to a receive beam in the set of one or more receive beams, and a correspondence of the receive beam to the selected first set of time-frequency resources. The instructions may be further executable to transmit a grantless transmission on at least the first set of time-frequency resources.

In one example, a method for wireless communication at a base station is described. The method may include determining timing information for an uplink subframe and a time-frequency resource configuration for the uplink subframe. The time-frequency resource configuration may identify a correspondence between at least one receive beam in a set of one or more receive beams and at least one set of time-frequency resources in one or more sets of time-frequency resources of the uplink subframe. The method may also include transmitting the timing information for the uplink subframe and the time-frequency resource configuration for the uplink subframe, and monitoring for transmissions on the at least one receive beam in accordance with the correspondence between the at least one receive beam and the at least one set of time-frequency resources.

In some examples of the method, the timing information for the uplink subframe may include an indication of a fixed timing of the uplink subframe, a first timing offset of the uplink subframe relative to a DRS transmission, or a second timing offset of the uplink subframe relative to a trigger transmission. In some examples, the method may include transmitting the trigger transmission in at least one of a broadcast transmission or a UE-specific transmission. In some examples, the trigger transmission may include at least a portion of the time-frequency resource configuration for the uplink subframe. In some examples, the method may include transmitting a system information transmission including at least one of the timing information for the uplink subframe, or at least a portion of the time-frequency resource configuration for the uplink subframe.

In some examples of the method, the time-frequency resource configuration for the uplink subframe may further identify a correspondence between at least one transmission type and the at least one set of time-frequency resources in the one or more sets of time-frequency resources of the uplink subframe. In some examples, the at least one transmission type may include at least one of an ACK/NACK transmission type, a random access transmission type, a CQI transmission type, a SR transmission type, a SRS transmission type, a grantless PUSCH transmission type, or a combination thereof. In some examples, the correspondence between the at least one transmission type and the at least one set of time-frequency resources may be based at least in part on a first allocation of different bandwidths to different transmission types, a second allocation of different CDM codes to different transmission types, a third allocation of different OCCs to different transmission types, or a combination thereof. In some examples, the time-frequency resource configuration for the uplink subframe may further identify a correspondence between at least one UE and the at least one set of time-frequency resources in one or more sets of time-frequency resources of the uplink subframe. In some examples, the time-frequency resource configuration for the uplink subframe may further include a first LBT gap allocated for at least one beam direction and located prior to all of the one or more sets of time-frequency resources corresponding to the one or more receive beams, a second LBT gap allocated for all beam directions and located prior to all of the one or more sets of time-frequency resources corresponding to the one or more receive beams, or a third LBT gap allocated for a single beam direction and located prior to a set of time-frequency resources corresponding to the single beam direction.

In some examples of the method, the uplink subframe may include a multi-beam subframe, and the correspondence between the at least one receive beam and the at least one set of time-frequency resources may include a correspondence between a plurality of receive beams and a plurality of sets of time-frequency resources. In some examples, the time-frequency resource configuration may identify at least one of a first timing of a first LBT gap associated with more than one receive beam, a second timing of a second LBT gap associated with a single receive beam, a transmission start time associated with at least one of the plurality of receive beams, or a combination thereof. In some examples, the uplink subframe may include a single-beam subframe, and the correspondence between the at least one receive beam and the at least one set of time-frequency resources may include a correspondence between a single receive beam and a single set of time-frequency resources. In some examples, the timing information for the uplink subframe may include an indication of a time window in which the uplink subframe is to be transmitted. In some examples, the method may include transmitting a trigger transmission on a receive beam during the time window, and the timing information for the uplink subframe may be relative to the trigger transmission.

In one example, an apparatus for wireless communication at a base station is described. The apparatus may include means for determining timing information for an uplink subframe and a time-frequency resource configuration for the uplink subframe. The time-frequency resource configuration may identify a correspondence between at least one receive beam in a set of one or more receive beams and at least one set of time-frequency resources in one or more sets of time-frequency resources of the uplink subframe. The apparatus may also include means for transmitting the timing information for the uplink subframe and the time-frequency resource configuration for the uplink subframe, and means for monitoring for transmissions on the at least one receive beam in accordance with the correspondence between the at least one receive beam and the at least one set of time-frequency resources.

In some examples of the apparatus, the timing information for the uplink subframe may include an indication of a fixed timing of the uplink subframe, a first timing offset of the uplink subframe relative to a DRS transmission, or a second timing offset of the uplink subframe relative to a trigger transmission. In some examples, the apparatus may include means for transmitting the trigger transmission in at least one of a broadcast transmission or a UE-specific transmission. In some examples, the trigger transmission may include at least a portion of the time-frequency resource configuration for the uplink subframe. In some examples, the apparatus may include transmitting a system information transmission including at least one of the timing information for the uplink subframe, or at least a portion of the time-frequency resource configuration for the uplink subframe.

In some examples of the apparatus, the time-frequency resource configuration for the uplink subframe may further identify a correspondence between at least one transmission type and the at least one set of time-frequency resources in the one or more sets of time-frequency resources of the uplink subframe. In some examples, the at least one transmission type may include at least one of an ACK/NACK transmission type, a random access transmission type, a CQI transmission type, a SR transmission type, a SRS transmission type, a grantless PUSCH transmission type, or a combination thereof. In some examples, the correspondence between the at least one transmission type and the at least one set of time-frequency resources may be based at least in part on a first allocation of different bandwidths to different transmission types, a second allocation of different CDM codes to different transmission types, a third allocation of different OCCs to different transmission types, or a combination thereof. In some examples, the time-frequency resource configuration for the uplink subframe may further identify a correspondence between at least one UE and the at least one set of time-frequency resources in one or more sets of time-frequency resources of the uplink subframe. In some examples, the time-frequency resource configuration for the uplink subframe may further include a first LBT gap allocated for at least one beam direction and located prior to all of the one or more sets of time-frequency resources corresponding to the one or more receive beams, a second LBT gap allocated for all beam directions and located prior to all of the one or more sets of time-frequency resources corresponding to the one or more receive beams, or a third LBT gap allocated for a single beam direction and located prior to a set of time-frequency resources corresponding to the single beam direction.

In some examples of the apparatus, the uplink subframe may include a multi-beam subframe, and the correspondence between the at least one receive beam and the at least one set of time-frequency resources may include a correspondence between a plurality of receive beams and a plurality of sets of time-frequency resources. In some examples, the time-frequency resource configuration may identify at least one of a first timing of a first LBT gap associated with more than one receive beam, a second timing of a second LBT gap associated with a single receive beam, a transmission start time associated with at least one of the plurality of receive beams, or a combination thereof. In some examples, the uplink subframe may include a single-beam subframe, and the correspondence between the at least one receive beam and the at least one set of time-frequency resources may include a correspondence between a single receive beam and a single set of time-frequency resources. In some examples, the timing information for the uplink subframe may include an indication of a time window in which the uplink subframe is to be transmitted. In some examples, the apparatus may include means for transmitting a trigger transmission on a receive beam during the time window, and the timing information for the uplink subframe may be relative to the trigger transmission.

In one example, another apparatus for wireless communication at a base station is described. The apparatus may include a processor, memory in electronic communication with the processor, and instructions stored in the memory. The instructions may be executable by the processor to determine timing information for an uplink subframe and a time-frequency resource configuration for the uplink subframe. The time-frequency resource configuration may identify a correspondence between at least one receive beam in a set of one or more receive beams and at least one set of time-frequency resources in one or more sets of time-frequency resources of the uplink subframe. The instructions may also be executable by the processor to transmit the timing information for the uplink subframe and the time-frequency resource configuration for the uplink subframe, and to monitor for transmissions on the at least one receive beam in accordance with the correspondence between the at least one receive beam and the at least one set of time-frequency resources.

In some examples of the apparatus, the timing information for the uplink subframe may include an indication of a fixed timing of the uplink subframe, a first timing offset of the uplink subframe relative to a DRS transmission, or a second timing offset of the uplink subframe relative to a trigger transmission. In some examples, the instructions may be executable by the processor to transmit a system information transmission including at least one of the timing information for the uplink subframe, or at least a portion of the time-frequency resource configuration for the uplink subframe. In some examples, the time-frequency resource configuration for the uplink subframe may further identify a correspondence between at least one transmission type and the at least one set of time-frequency resources in the one or more sets of time-frequency resources of the uplink subframe. In some examples, the time-frequency resource configuration for the uplink subframe may further identify a correspondence between at least one UE and the at least one set of time-frequency resources in one or more sets of time-frequency resources of the uplink subframe.

In some examples of the apparatus, the uplink subframe may include a multi-beam subframe, and the correspondence between the at least one receive beam and the at least one set of time-frequency resources may include a correspondence between a plurality of receive beams and a plurality of sets of time-frequency resources. In some examples, the time-frequency resource configuration may identify at least one of a first timing of a first LBT gap associated with more than one receive beam, a second timing of a second LBT gap associated with a single receive beam, a transmission start time associated with at least one of the plurality of receive beams, or a combination thereof. In some examples, the uplink subframe may include a single-beam subframe, and the correspondence between the at least one receive beam and the at least one set of time-frequency resources may include a correspondence between a single receive beam and a single set of time-frequency resources. In some examples, the timing information for the uplink subframe may include an indication of a time window in which the uplink subframe is to be transmitted. In some examples, the instructions may be executable by the processor to transmit a trigger transmission on a receive beam during the time window, and the timing information for the uplink subframe may be relative to the trigger transmission.

In one example, a non-transitory computer-readable medium storing code for wireless communication at a base station is described. The code may include instructions executable to determine timing information for an uplink subframe and a time-frequency resource configuration for the uplink subframe. The time-frequency resource configuration may identify a correspondence between at least one receive beam in a set of one or more receive beams and at least one set of time-frequency resources in one or more sets of time-frequency resources of the uplink subframe. The code may also include instructions executable to transmit the timing information for the uplink subframe and the time-frequency resource configuration for the uplink subframe, and to monitor for transmissions on the at least one receive beam in accordance with the correspondence between the at least one receive beam and the at least one set of time-frequency resources.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
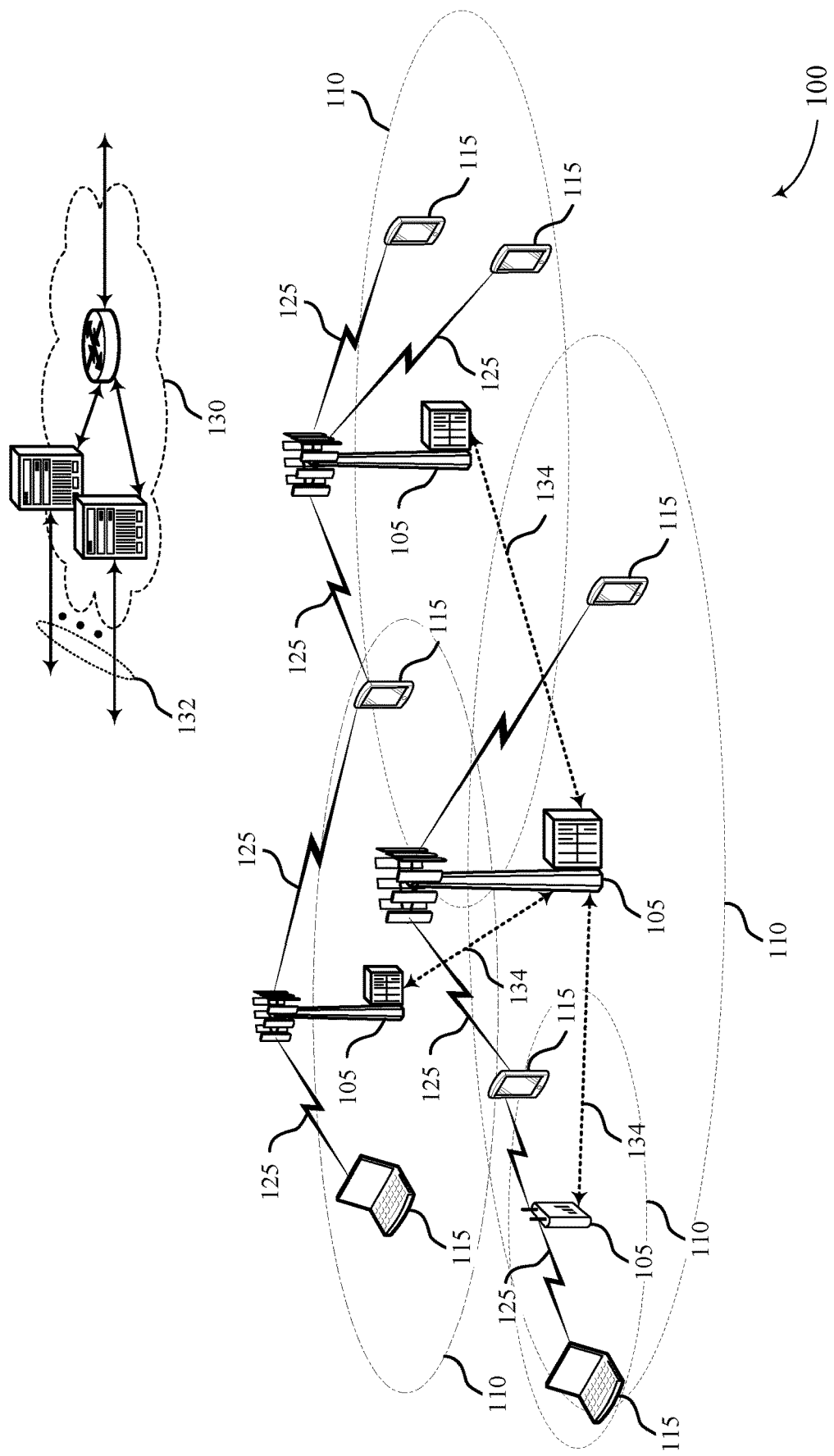
FIGS. 1 and 2 show examples of wireless communication systems, in accordance with various aspects of the present disclosure.

A wireless communication system (e.g., a mmW system) may utilize directional or beamformed transmissions (e.g., beams) for communication. For example, a base station may transmit signals on multiple beams associated with different directions. In some cases, the base station may engage in beam sweeping over a portion (or all) of the possible beams for transmitting messages or signals intended for UEs distributed throughout a coverage area of the base station. For example, a base station may transmit DRSs using one or more beams. A UE that receives a DRS from the base station may use the DRS to synchronize with the base station, to acquire a network, and to obtain information for initiating a random access procedure with the base station. A UE may also measure a DRS or use a DRS for other purposes.

In some cases, a UE may want or need to transmit a grantless transmission to a base station. The grantless transmission may include, for example, a random access (or random access channel (RACH)) transmission, a channel quality information (CQI) transmission, a scheduling request (SR) transmission, a sounding reference signal (SRS) transmission, a grantless physical uplink shared channel (PUSCH) transmission, etc. In a licensed radio frequency spectrum band, a base station may allocate resources for periodic or aperiodic grantless transmissions on an uplink, knowing that the resources will be available. For communications between a base station and one or more UEs in an unlicensed (or shared) radio frequency spectrum band, the base station may allocate resources for periodic or aperiodic grantless transmissions on an uplink, but the resources may or may not be available to a UE. For example, a UE may perform a LBT procedure prior to using the resources, and may determine that the unlicensed (or shared) radio frequency spectrum band is in use by another device and unavailable. The transmission of periodic or aperiodic grantless transmissions over an unlicensed (or shared) radio frequency spectrum band may be further complicated in a wireless communication system (e.g., a mmW communication system) that transmits on beams (i.e., on directional beams).

Techniques described in the present disclosure may be used to signal a PLMN ID based at least in part on a time-frequency location of an instance of a DRS. Signaling the PLMN ID to a UE early, instead of waiting for the UE to discover the PLMN ID during performance of a random access procedure, may reduce the number of random access procedures performed by the UE, thereby conserving resources.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various operations may be added, omitted, or combined. Also, features described with respect to some examples may be combined in some other examples.

FIG. 1 illustrates an example of a wireless communication system 100, in accordance with various aspects of the present disclosure. The wireless communication system 100 includes base stations 105, UEs 115, and a core network 130. In some examples, the wireless communication system 100 may be a Long Term Evolution (LTE), LTE-Advanced (LTE-A) network, or a New Radio (NR) network. In some cases, wireless communication system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communication system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communication system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communication system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS).

The core network 130 may provide user authentication, access authorization, tracking, IP connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

At times, a UE 115 may perform an initial access (or initial acquisition) procedure with a base station 105. When performing the initial access procedure, the UE 115 may search for a synchronization channel transmitted by the base station 105. The synchronization channel may include information to synchronize the UE 115 with the base station 105, so that the UE 115 may communicate with the base station 105. After synchronizing with the base station 105, the UE 115 may initiate a random access procedure with the network by transmitting a random access preamble to the network.

In some examples, a UE 115 may include a wireless communication manager. The wireless communication manager may be used by the UE 115 to receive timing information for an uplink subframe, and a time-frequency resource configuration for the uplink subframe. The time-frequency resource configuration may identify a correspondence between at least one receive beam in a set of one or more receive beams and at least one set of time-frequency resources in one or more sets of time-frequency resources of the uplink subframe. The wireless communication manager may also be used by the UE 115 to select at least a first set of time-frequency resources of the uplink subframe on which to transmit. The first set of time-frequency resources may be selected based at least in part on a transmit beam of the UE, a correspondence of the transmit beam to a receive beam in the set of one or more receive beams, and a correspondence of the receive beam to the selected first set of time-frequency resources. The wireless communication manager may further be used by the UE 115 to transmit a grantless transmission on at least the first set of time-frequency resources.

In some examples, a base station 105 may include a wireless communication manager. The wireless communication manager may be used by the base station 105 to determine a timing information for an uplink subframe, and a time-frequency resource configuration for the uplink subframe. The time-frequency resource configuration may identify a correspondence between at least one receive beam in a set of one or more receive beams and at least one set of time-frequency resources in one or more sets of time-frequency resources of the uplink subframe. The wireless communication manager may also be used to transmit the timing information for the uplink subframe and the time-frequency resource configuration for the uplink subframe, and to monitor for transmissions on the at least one receive beam in accordance with the correspondence between the at least one receive beam and the at least one set of time-frequency resources.

The base stations 105 and UEs 115 may communicate over a licensed radio frequency spectrum band and/or an unlicensed (or shared) radio frequency spectrum band. The licensed radio frequency spectrum band may include a radio frequency spectrum band that is licensed to particular users for particular uses. The unlicensed (or shared) radio frequency spectrum band may include a radio frequency spectrum band that is available for Wi-Fi use, a radio frequency spectrum band that is available for use by different radio access technologies, or a radio frequency spectrum band that is available for use by multiple MNOs in an equally shared or prioritized manner.

In some cases, a UE 115 may transmit to a base station 105 on an uplink, in accordance with an uplink grant received from the base station 105 (e.g., in accordance with uplink grants received on a physical uplink control channel (PUCCH)). In other cases, a UE 115 may transmit to a base station 105 on an uplink in the absence of an uplink grant. For example, a UE 115 may transmit a periodic or aperiodic grantless transmission to a base station 105, such as a random access (or random access channel (RACH)) transmission, a CQI transmission, a SR transmission, a SRS transmission, a grantless PUSCH transmission, etc.

For communications between a base station 105 and one or more UEs 115 in a licensed radio frequency spectrum band, the base station 105 may allocate resources for periodic or aperiodic grantless transmissions on an uplink, knowing that the resources will be available. For communications between a base station 105 and one or more UEs 115 in an unlicensed (or shared) radio frequency spectrum band, the base station 105 may allocate resources for periodic or aperiodic grantless transmissions on an uplink, but the resources may or may not be available to a UE 115. For example, the UE 115 may perform a LBT procedure prior to using the resources, and may determine that the unlicensed (or shared) radio frequency spectrum band is in use by another device and unavailable.

In a MulteFire wireless communication system, a base station 105 may configure a pseudo-periodic time window in which one or more UEs may transmit on an uplink over an unlicensed (or shared) radio frequency spectrum band. However, in a mmW wireless communication system, a base station 105 needs to commit to monitoring for uplink transmissions on a particular beam (i.e., in a particular beam direction) during a particular time-frequency resource, and thus, omnidirectional monitoring of an unlicensed (or shared) radio frequency spectrum band during a pseudo-periodic time window may not be sufficient to receive a directional transmission on a beam.

In some examples, a base station 105 may allocate resources for periodic or aperiodic grantless transmissions on an uplink by determining a timing of an uplink subframe for such transmissions, determining a time-frequency resource configuration of the uplink subframe, and transmitting the timing of the uplink subframe and the time-frequency resource configuration of the uplink subframe (e.g., to one or more UEs 115). In some examples, the timing of the uplink subframe may be a periodic timing. The time-frequency resource configuration of the uplink subframe may identify a correspondence between at least one receive beam in a set of one or more receive beams and at least one set of time-frequency resources in one or more sets of time-frequency resources of the uplink subframe (i.e., the base station 105 may commit to listening for uplink transmissions in particular beam directions during particular time-frequency resources). In some examples, the uplink subframe may be a multi-beam subframe, and the correspondence between the at least one receive beam and the at least one set of time-frequency resources may include a correspondence between a plurality of receive beams and a plurality of sets of time-frequency resources. A UE 115 may transmit on one or more transmit beams corresponding to one or more receive beams identified in the time-frequency resource configuration of the multi-beam uplink subframe. In some examples, the uplink subframe may be a single-beam subframe, and the correspondence between the at least one receive beam and the at least one set of time-frequency resources may include a correspondence between a single receive beam and a single set of time-frequency resources.

Figure 2:
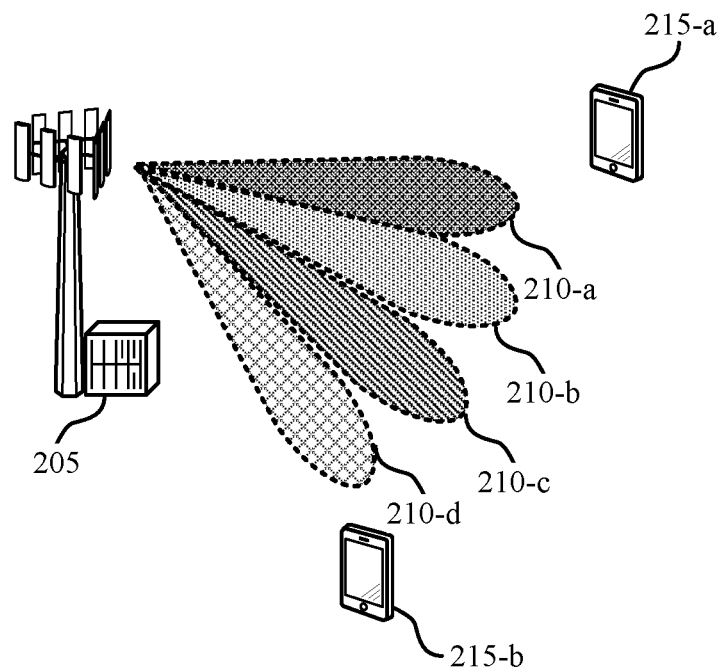
Figure 2:
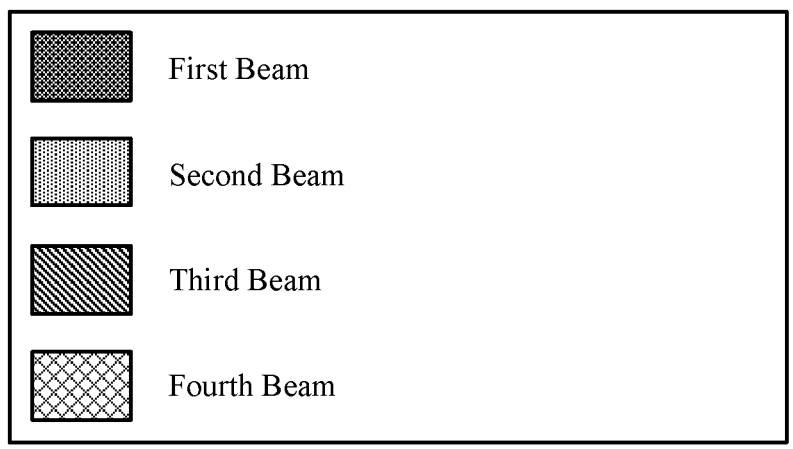

FIG. 2 illustrates an example of a wireless communication system 200, in accordance with various aspects of the present disclosure. The wireless communication system 200 may include a base station 205, a first UE 215-$a$, and a second UE 215-$b$, which may be examples of the base stations and UEs described with reference to FIG. 1.

In a mmW communication system, the base station 205 and UEs 215 may utilize directional transmissions for communications. In some examples, the base station 205 and UEs 215 may transmit and receive on a number of directional beams (e.g., using beamformed transmissions). By way of example, the base station 205 is shown to have a capability to transmit or receive on a first beam 210-$a$, a second beam 210-$b$, a third beam 210-$c$, and a fourth beam 210-$d$. In alternative examples, the number of beams on which the base station 205 is capable of transmitting may be fewer or greater. The UEs 215 may similarly be capable of transmitting and receiving on a number of beams, and in some examples may be capable of transmitting and receiving on a different number of beams (e.g., beams) than the base station 205.

In some examples, the base station 205 and a UE 215 may undertake a beam training procedure, in which pairs of beams of the base station 205 and the UE 215, which beams are generally aligned and suitable for communication between the base station 205 and the UE 215, may be identified.

Figure 3:
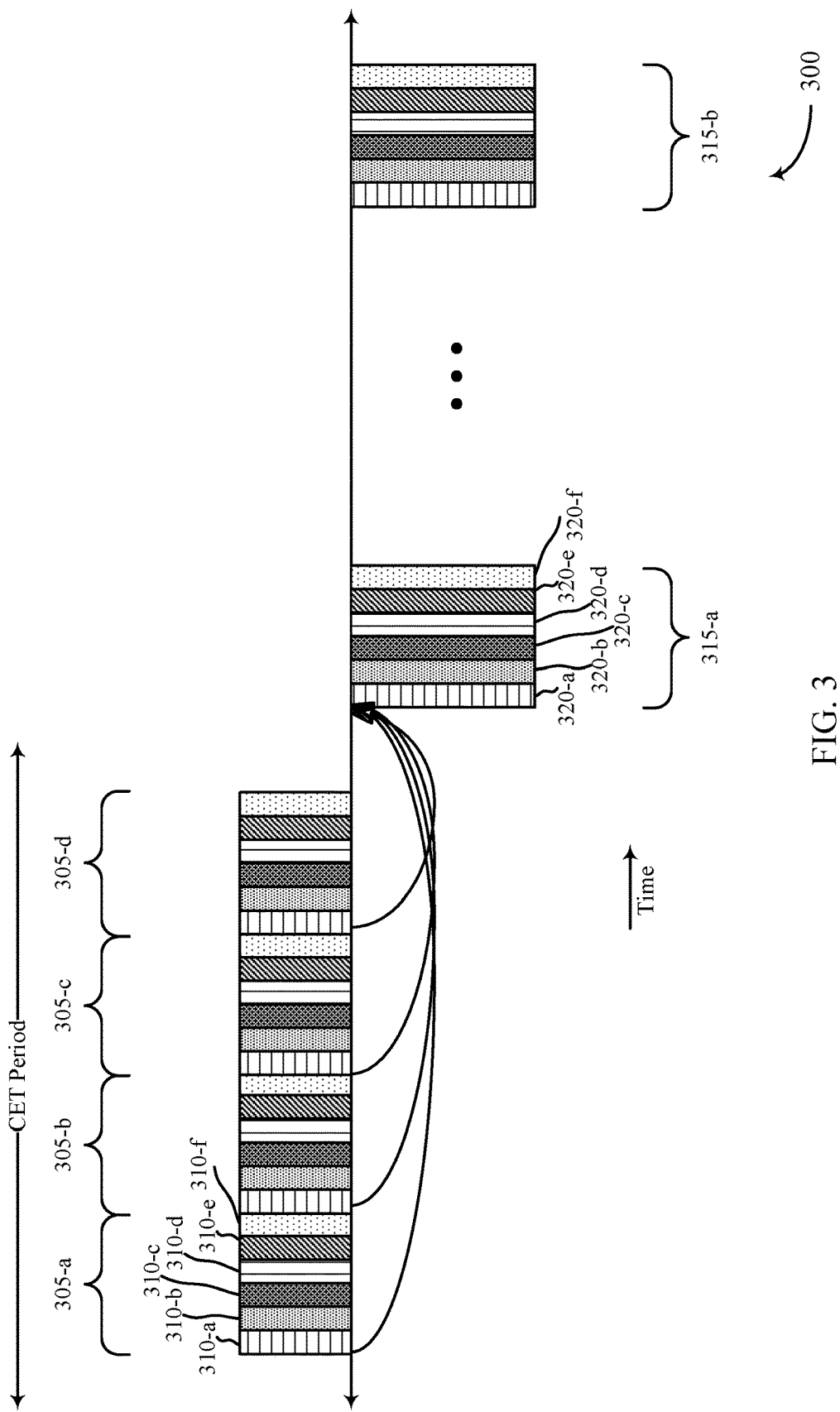
FIG. 3 shows an example timeline of transmissions on a downlink and resource allocations on an uplink, in accordance with various aspects of the present disclosure.

FIG. 3 shows an example timeline 300 of transmissions on a downlink and resource allocations on an uplink, in accordance with various aspects of the present disclosure. The transmissions on the downlink are shown above the timeline 300, and may be made by a base station, such as one of the base stations described with reference to FIG. 1. The resource allocations on the uplink are shown below the timeline 300, and may be made by the base station and used by one or more UEs, such as one or more of the UEs described with reference to FIG. 1.

The transmissions on the downlink may include various types of transmissions, including, for example, DRS transmissions. By way of example, FIG. 3 shows the transmissions on the downlink to include multi-beam DRS transmissions 305 (e.g., a first multi-beam DRS transmission 305-$a$, a second multi-beam DRS transmission 305-$b$, a third multi-beam DRS transmission 305-$c$, and a fourth multi-beam DRS transmission 305-$d$). Also by way of example, each multi-beam DRS transmission 305 is shown to include a directional DRS transmission 310 on each of six beams (e.g., a first directional DRS transmission 310-$a$ on a first beam, a second directional DRS transmission 310-$b$ on a second beam, a third directional DRS transmission 310-$c$ on a third beam, a fourth directional DRS transmission 310-$d$ on a fourth beam, a fifth directional DRS transmission 310-$e$ on a fifth beam, and a sixth directional DRS transmission 310-$f$ on a sixth beam). In some examples, the multi-beam DRS transmissions 305 may be transmitted during an instance of a periodic contention exempt transmission (CET) period. In some examples, the transmissions on the uplink may also or alternatively include directional DRS transmissions that are not part of a multi-beam DRS transmission 305.

The transmissions on the downlink may be made over a licensed radio frequency spectrum band or an unlicensed (or shared) radio frequency spectrum band. When the transmissions on the downlink are made over an unlicensed (or shared) radio frequency spectrum band, the transmissions may be made during a CET period. During the CET period, the base station does not need to perform a LBT procedure to contend for access to the unlicensed (or shared) radio frequency spectrum band. Alternatively, the transmissions on the downlink may be made outside a CET period, and the base station may need to perform one or more LBT procedures before making the transmissions.

The resource allocations on the uplink may include resource allocations 320 for a periodic multi-beam uplink subframe 315 (e.g., a first uplink subframe 315-a or a second uplink subframe 315-b). The resource allocations 320 may include a first resource allocation 320-a for a first beam, a second resource allocation 320-b for a second beam, a third resource allocation 320-c for a third beam, a fourth resource allocation 320-d for a fourth beam, a fifth resource allocation 320-e for a fifth beam, and a sixth resource allocation 320-f for a sixth beam. The resource allocations 320 on the uplink may be made for a licensed radio frequency spectrum band or an unlicensed (or shared) radio frequency spectrum band. When resources for the uplink subframe 315 are allocated in an unlicensed (or shared) radio frequency spectrum band, a UE may be required to perform one or more LBT procedures prior to transmitting on the resources. When a result of a LBT procedure indicates that the unlicensed (or shared) radio frequency spectrum band or a channel thereof is unavailable, a UE may be unable to transmit in an instance of the uplink subframe 315 (or on a particular beam within the instance of the uplink subframe 315). In some cases, one or more UEs may be able transmit in an instance of the uplink subframe 315 (or on a particular beam within the instance of the uplink subframe 315), and one or more other UEs may not be able to transmit in the instance of the uplink subframe 315 (or on a particular beam within the instance of the uplink subframe 315).

It is to be understood that references to a subframe may refer to any time period associated with uplink and/or downlink transmissions. Example transmission time periods may include, but are not limited to, a mini-slot, a slot, a subframe, a frame, a transmission opportunity (TxOP), a transmission time interval (TTI), and the like.

In some examples, a multi-beam DRS transmission 305 (or singular directional DRS transmission) may include timing information for the periodic uplink subframe 315 or an instance thereof, and a time-frequency resource configuration for the periodic uplink subframe 315 or an instance thereof. The timing information and time-frequency resource configuration enable the base station to monitor (i.e., listen) for uplink transmissions on particular beams at particular times within the uplink subframe 315. The timing information may include a timing offset of the uplink subframe 315 relative to the multi-beam DRS transmission 305. In some examples, each directional DRS transmission 310 of an instance of the multi-beam DRS transmission 305 may include a relative timing offset between a start (or other reference point) of the instance of the multi-beam DRS transmission 305 and a start (or other reference point) of an instance of the multi-beam uplink subframe 315. In other examples, each directional DRS transmission 310 of the multi-beam DRS transmission 305 may include a relative timing offset between a start of a directional DRS transmission 310 for a beam and a start of a resource allocation 320 for the beam in an instance of the uplink subframe 315.

The time-frequency resource configuration for the periodic uplink subframe 315 or an instance thereof may identify a correspondence between at least one receive beam 310 of the base station and at least one set of time-frequency resources in one or more sets of time-frequency resources of the uplink subframe 315. In some examples, each directional DRS transmission 310 of the multi-beam DRS transmission 305 may include the same time-frequency resource configuration information for the uplink subframe 315. In other examples, each directional DRS transmission 310 of the multi-beam DRS transmission 305 may include a time-frequency resource configuration for a corresponding beam 310 of the uplink subframe 315.

A UE may select at least a first set of time-frequency resources of the uplink subframe 315 on which to transmit. The first set of time-frequency resources may be selected based at least in part on a transmit beam of the UE. The first set of time-frequency resources may also be selected based at least in part on a correspondence of the transmit beam to a receive beam of the base station (e.g., based at least in part on a beam training process that pairs a transmit beam of the UE with a receive beam of the base station), and on a correspondence of the receive beam to the first set of time-frequency resources. In some examples, the UE may select multiple sets of time-frequency resources of the uplink subframe 315 on which to transmit, and may transmit on the time-frequency resources using different transmit beams.

A UE may transmit a grantless transmission on the first set of time-frequency resources of the uplink subframe 315 (or on other selected sets of time-frequency resources of the uplink subframe 315). For purposes of the present disclosure, a "grantless" transmission is a transmission that may be transmitted in the absence of an uplink grant, on time-frequency resources that are made available for uplink transmissions. In some cases, the UE may not transmit during an uplink subframe 315, despite the uplink subframe 315 including time-frequency resources that are available to the UE. A grantless transmission may be a periodic transmission or an aperiodic transmission, and in some examples may include a random access (or RACH) transmission, a CQI transmission, a SR transmission, a SRS transmission, a grantless PUSCH transmission, etc.

FIG. 3 shows one example of how timing information and a time-frequency resource configuration for a multi-beam uplink subframe 315 may be transmitted (or signaled) to a UE. In some examples, a portion or all of the timing information and time-frequency resource configuration for a multi-beam uplink subframe 315 may be transmitted (or signaled) in system information (e.g., in a system information block (SIB)).

FIG. 3 also shows an example in which the timing information for a multi-beam uplink subframe 315 includes a timing offset of the uplink subframe relative to a multi-beam DRS transmission. In some examples, the timing information for a multi-beam uplink subframe may include a semi-statically fixed timing (e.g., an absolute timing, or a timing fixed to a sequence of radio frames). In some examples, the timing information for a multi-beam uplink subframe may include a timing offset of the uplink subframe relative to a trigger transmission (e.g., a transmission sent to poll UEs for uplink transmissions). The trigger transmission may be transmitted/received in a broadcast transmission (e.g., on a physical broadcast channel (PBCH)) or a UE-specific transmission. In some examples, a trigger transmission may include a portion (or all) of the timing information or time-frequency resource configuration for a multi-beam uplink subframe. A portion (or all) of the timing information or time-frequency resource configuration for the multi-beam uplink subframe may also be configured prior to the trigger transmission (e.g., in system information).

In some examples, the time-frequency resource configuration for a multi-beam uplink subframe 315 may also identify a correspondence between at least one transmission type and the at least one set of time-frequency resources in the one or more sets of time-frequency resources of the uplink subframe 315. For example, different bandwidths (i.e., frequency ranges) of time-frequency resources may be allocated to different transmission types (e.g., a first 20 MHz of a 100 MHz bandwidth may be allocated to random access transmissions, a second 20 MHz of the 100 MHz bandwidth may be allocated to ACK/NACK transmissions, etc.). As another example, different CDM codes may be allocated to different transmissions types. As another example, different OCCs may be allocated to different transmission types. The same allocations may be made across all beams, or different allocations may be made for different beams. In some examples, the transmission types may include at least one of an ACK/NACK transmission type, a random access transmission type, a CQI transmission type, a SR transmission type, a SRS transmission type, a grantless PUSCH transmission type, or a combination thereof.

In some examples, the time-frequency resource configuration for a multi-beam uplink subframe 315 may also identify a correspondence between at least one UE and the at least one set of time-frequency resources in one or more sets of time-frequency resources of the uplink subframe 315. For example, different bandwidths, CDM codes, OCCs, or a combination thereof may be allocated to different UEs, or some bandwidths, CDM codes, OCCs, or a combination thereof may be allocated for use by any UE (or by a subset of UEs).

In some examples, a correspondence between receive beams, transmission types, and UEs may be defined. For example, a first bandwidth of each beam may be allocated for random access transmissions by any UE, and/or a second bandwidth of each beam (or just one or a subset of beams) may be allocated to a single UE or subset of UEs for any type of grantless transmission the UE(s) have to transmit. Placing limits on the bandwidth(s) in which a UE may transmit within a multi-beam uplink subframe 315 can reduce the frequencies for which the UE may need to perform a LBT procedure and increase its chances of succeeding in the LBT procedure.

A UE's transmission on a beam within a multi-beam uplink subframe 315 should not interfere with the transmissions of other UEs on other beams, and similarly should not be interfered with by the transmissions of other UEs on other beams. When the multi-beam uplink subframe 315 is configured for an unlicensed (or shared) radio frequency spectrum band, a UE may need to perform a LBT procedure before transmitting on a beam (or on multiple beams) within the uplink subframe 315. In other cases, the time-frequency resources of the uplink subframe 315 may be included within a CET period, and a UE may not need to perform a LBT procedure before transmitting on a beam (or on multiple beams) within the uplink subframe 315. FIGS. 4-7 show various techniques for allocating resources within a multi-beam uplink subframe (at a base station), and for performing one or more LBT procedures before transmitting on a beam within a multi-beam uplink subframe (at a UE), when the multi-beam uplink subframe is configured for an unlicensed (or shared) radio frequency spectrum band.

Figure 4:
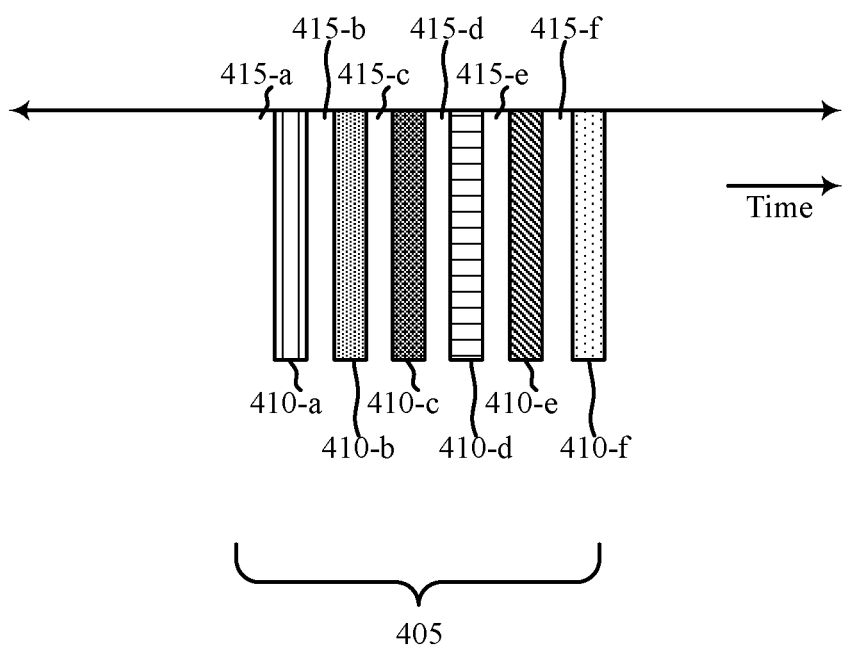
FIGS. 4-6 show example timelines of resource allocations on an uplink in an unlicensed (or shared) radio frequency spectrum band, in accordance with various aspects of the present disclosure.

FIG. 4 shows an example timeline 400 of resource allocations on an uplink in an unlicensed (or shared) radio frequency spectrum band, in accordance with various aspects of the present disclosure. The resource allocations may be made by a base station and used by one or more UEs. The base station and UE(s) may be examples of the base stations and UEs described with reference to FIG. 1.

The resource allocations on the uplink may include resource allocations 410 for a multi-beam uplink subframe 405. Because the resources of the uplink subframe 405 are allocated in an unlicensed (or shared) radio frequency spectrum band, a UE may be required to perform one or more LBT procedures prior to transmitting on the resources. When a result of a LBT procedure indicates that the unlicensed (or shared) radio frequency spectrum band, or a channel thereof, is unavailable, a UE may be unable to transmit in the uplink subframe 405 (or on a particular beam within the uplink subframe 405). In some cases, one or more UEs may be able transmit in the uplink subframe 405 (or on a particular beam within the uplink subframe 405), and one or more other UEs may not be able to transmit in the uplink subframe 405 (or on a particular beam within the uplink subframe 405).

By way of example, the uplink subframe 405 is shown in FIG. 4 to include a resource allocation for each of a plurality of beams 410 (e.g., a first resource allocation 410-$a$ for a first beam, a second resource allocation 410-$b$ for a second beam, a third resource allocation 410-$c$ for a third beam, a fourth resource allocation 410-$d$ for a fourth beam, a fifth resource allocation 410-$e$ for a fifth beam, and a sixth resource allocation 410-$f$ for a sixth beam). A LBT gap 415 may be allocated prior to each beam's resource allocation 410, such that a first LBT gap 415-$a$ is allocated prior to the first resource allocation 410-$a$, a second LBT gap 415-$b$ is allocated prior to the second resource allocation 410-$b$, a third LBT gap 415-$c$ is allocated prior to the third resource allocation 410-$c$, a fourth LBT gap 415-$d$ is allocated prior to the fourth resource allocation 410-$d$, a fifth LBT gap 415-$e$ is allocated prior to the fifth resource allocation 410-$e$, and a sixth LBT gap 415-$f$ is allocated prior to the sixth resource allocation 410-$f$. In some examples, the collection of LBT gaps 415 and resource allocations 410 may be contiguous. The arrangement of LBT gaps 415 and resource allocations 410 may be referred to as a per-beam contention gap arrangement. In some examples, configurations of the LBT gaps 415 may be identified as part of the time-frequency resource configuration for the uplink subframe 405.

Figure 5:
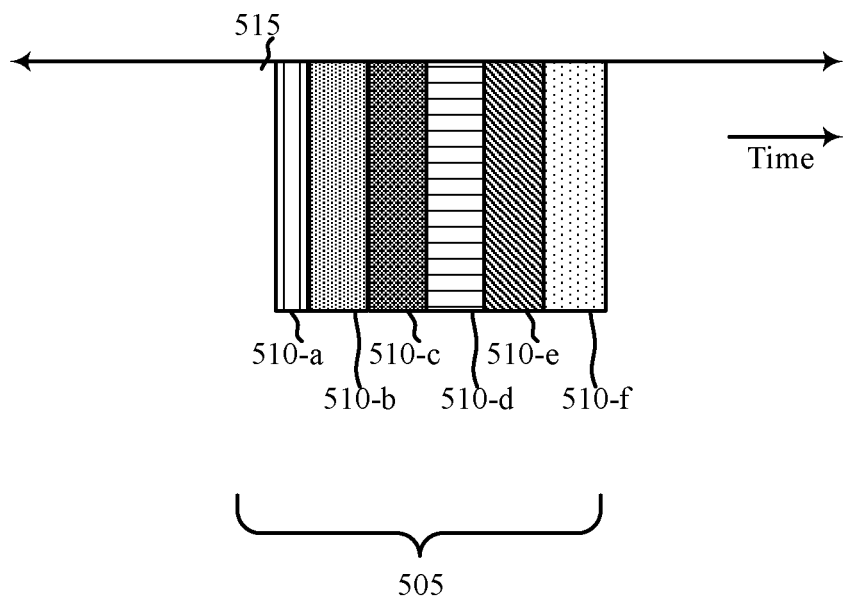

FIG. 5 shows an example timeline 500 of resource allocations on an uplink in an unlicensed (or shared) radio frequency spectrum band, in accordance with various aspects of the present disclosure. The resource allocations may be made by a base station and used by one or more UEs. The base station and UE(s) may be examples of the base stations and UEs described with reference to FIG. 1.

The resource allocations on the uplink may include resource allocations 510 for a multi-beam uplink subframe 505. Because the resources of the uplink subframe 505 are allocated in an unlicensed (or shared) radio frequency spectrum band, a UE may be required to perform one or more LBT procedures prior to transmitting on the resources. When a result of a LBT procedure indicates that the unlicensed (or shared) radio frequency spectrum band, or a channel thereof, is unavailable, a UE may be unable to transmit in the uplink subframe 505 (or on a particular beam within the uplink subframe 505). In some cases, one or more UEs may be able transmit in the uplink subframe 505 (or on a particular beam within the uplink subframe 405), and one or more other UEs may not be able to transmit in the uplink subframe 505 (or on a particular beam within the uplink subframe 505).

By way of example, the uplink subframe 505 is shown in FIG. 5 to include a resource allocation for each of a plurality of beams 510 (e.g., a first resource allocation 510-*a* for a first beam, a second resource allocation 510-*b* for a second beam, a third resource allocation 510-*c* for a third beam, a fourth resource allocation 510-*d* for a fourth beam, a fifth resource allocation 510-*e* for a fifth beam, and a sixth resource allocation 510-*f* for a sixth beam). A LBT gap 515 may be allocated prior to all of the resource allocations 510. In some examples, the LBT gap 515 and resource allocations 510 may be contiguous. A LBT procedure performed by a UE during the LBT gap 415 may be an omnidirectional LBT procedure or a pseudo-omnidirectional LBT procedure (e.g., the LBT procedure may be performed for all of the beam directions for which resources have been allocated in the uplink subframe 505). Alternatively, a UE that only intends to transmit on one beam (or a subset of beams) within the uplink subframe 505 may perform a LBT procedure (or LBT procedures) for just the beam(s) on which it intends to transmit. In some examples, a configuration of the LBT gap 515 may be identified as part of the time-frequency resource configuration for the uplink subframe 405.

Figure 6:
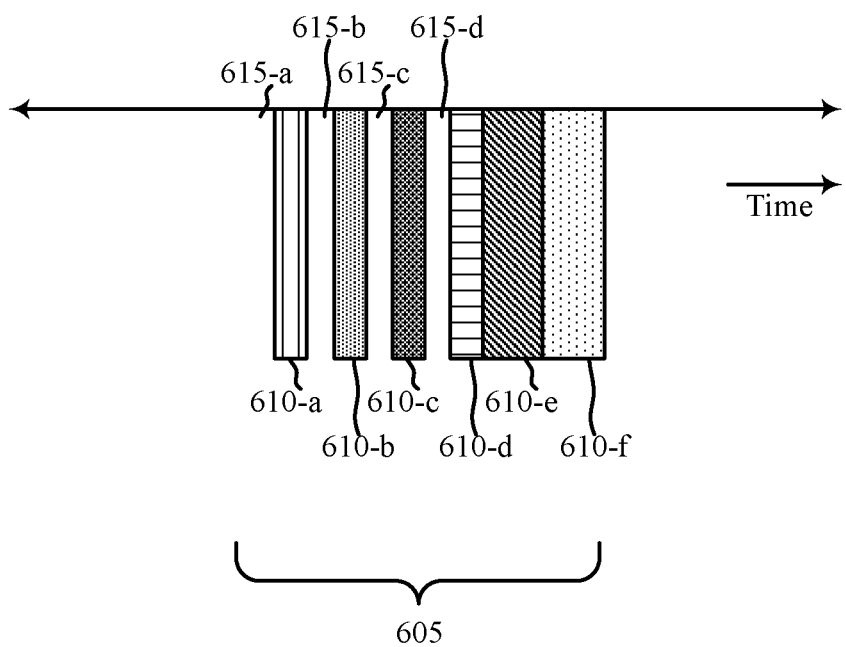

FIG. 6 shows an example timeline 600 of resource allocations on an uplink in an unlicensed (or shared) radio frequency spectrum band, in accordance with various aspects of the present disclosure. The resource allocations may be made by a base station and used by one or more UEs. The base station and UE(s) may be examples of the base stations and UEs described with reference to FIG. 1.

The resource allocations on the uplink may include resource allocations 610 for a multi-beam uplink subframe 605. Because the resources of the uplink subframe 605 are allocated in an unlicensed (or shared) radio frequency spectrum band, a UE may be required to perform one or more LBT procedures prior to transmitting on the resources. When a result of a LBT procedure indicates that the unlicensed (or shared) radio frequency spectrum band, or a channel thereof, is unavailable, a UE may be unable to transmit in the uplink subframe 605 (or on a particular beam within the uplink subframe 605). In some cases, one or more UEs may be able transmit in the uplink subframe 605 (or on a particular beam within the uplink subframe 605), and one or more other UEs may not be able to transmit in the uplink subframe 605 (or on a particular beam within the uplink subframe 605).

By way of example, the uplink subframe 605 is shown in FIG. 6 to include a resource allocation for each of a plurality of beams 610 (e.g., a first resource allocation 610-*a* for a first beam, a second resource allocation 610-*b* for a second beam, a third resource allocation 610-*c* for a third beam, a fourth resource allocation 610-*d* for a fourth beam, a fifth resource allocation 610-*e* for a fifth beam, and a sixth resource allocation 610-*f* for a sixth beam). A LBT gap 615 may be allocated prior to the resource allocation 610 for some beams, but not other beams. For example, a first LBT gap 615-*a* may be allocated prior to the first resource allocation 610-*a*, a second LBT gap 615-*b* may be allocated prior to the second resource allocation 610-*b*, a third LBT gap 615-*c* may be allocated prior to the third resource allocation 610-*c*, a fourth LBT gap 615-*d* may be allocated prior to the fourth resource allocation 610-*d*, but not LBT gap may be allocated prior to the fifth resource allocation 610-*e* or the sixth resource allocation 610-*f*. In some examples, the collection of LBT gaps 615 and resource allocations 610 may be contiguous.

In some examples, LBT gaps 615 may be defined based at least in part on feedback received by a base station for different beam directions. When UEs are having difficulty gaining access to unlicensed (or shared) spectrum in a particular beam direction, a LBT gap 615 may be allocated prior to the resource allocation 610 for that beam direction. Conversely, when UEs routinely gain access to unlicensed (or shared) spectrum in a particular beam direction, a LBT gap 615 may not be allocated prior to the resource allocation 610 for that beam direction. A LBT gap 615 may also be allocated or not allocated, prior to the resource allocation for a particular beam, based on the type(s) of transmission(s) expected to be transmitted on the beam (or in the uplink subframe 605). For example, grantless PUSCH transmissions may be allowed in only some uplink subframes.

In some examples, the configuration of each LBT gap 615 may be identified as part of the time-frequency resource configuration for the uplink subframe 605. In some examples, start times (or other reference points) of the resource allocations 610 may also be identified as part of the time-frequency resource configuration for the uplink subframe 605. Identifications of start times of the resource allocations can be useful when UEs implement different channel access types. For example, when a first UE performs a LBT procedure during the first LBT gap 615-*a*, but a second UE does not perform a LBT procedure during the first LBT gap 615-*a*, a base station's indication of a start time of the first resource allocation 610-*a* may enable the second UE to delay transmitting on resources of the first resource allocation 610-*a*, so as to not interfere with the LBT procedure performed by the first UE during the first LBT gap 615-*a*. In some examples, multiple start times may be supported for a resource allocation. For example, a resource allocation may be confined to a set of one or more symbol periods within the uplink subframe 605, and the base station may indicate which of a number of predetermined possible start times within the set of one or more symbol periods is used in the uplink subframe 605. The base station may indicate a single start time for all resource allocations that are preceded by a LBT gap 615, or different start times for different resource allocations. In some examples, the start time(s) may be indicated dynamically, in a directional DRS transmission or radio resource control (RRC) signaling for example.

In each of FIGS. 4-6, the type of LBT procedure performed in a LBT gap may be configured on a per-channel per-beam basis, or on a per-UE basis.

Figure 7:
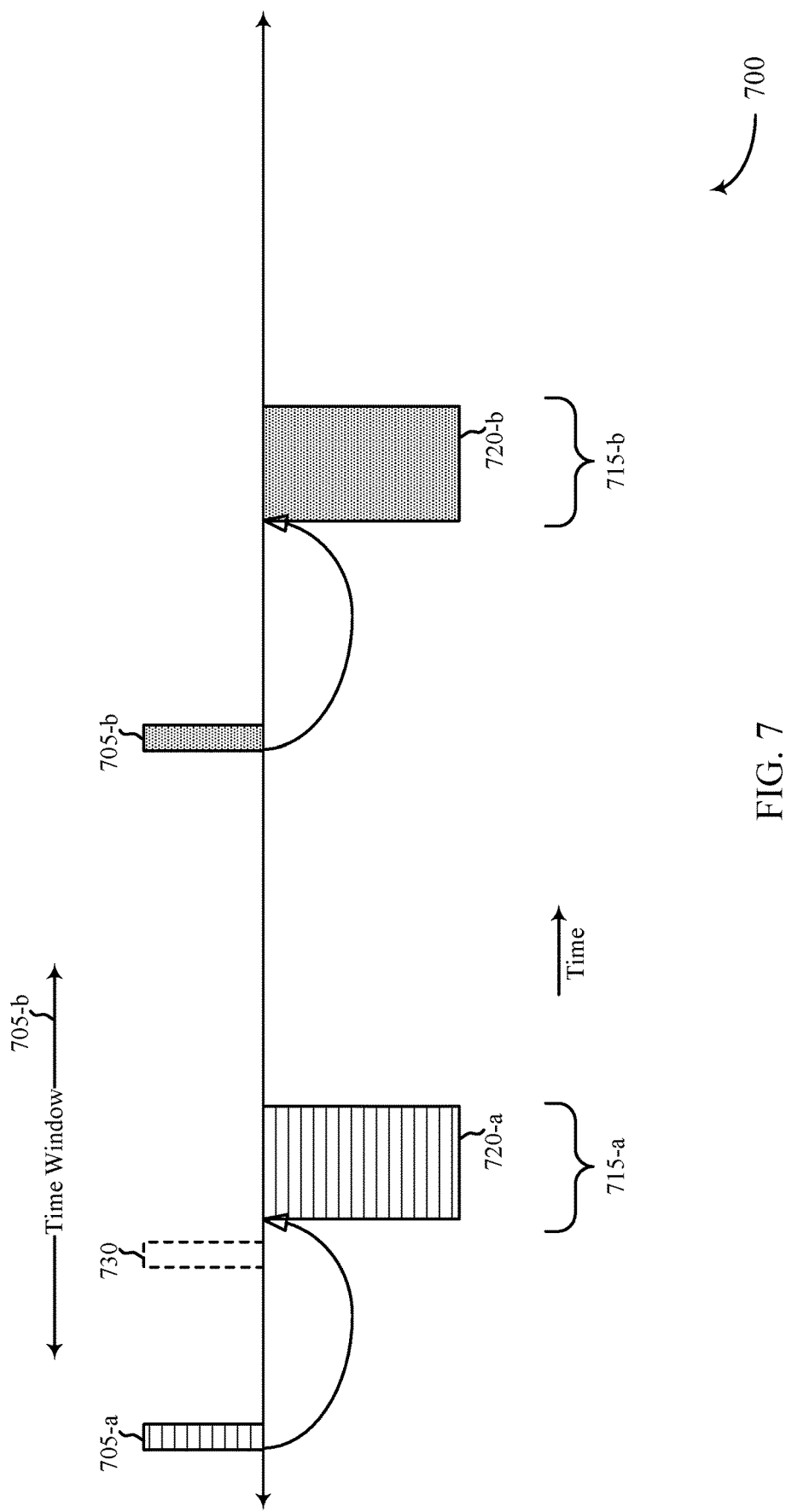
FIG. 7 shows an example timeline of transmissions on a downlink and resource allocations on an uplink, in accordance with various aspects of the present disclosure.

FIG. 7 shows an example timeline 700 of transmissions on a downlink and resource allocations on an uplink, in accordance with various aspects of the present disclosure. The transmissions on the downlink are shown above the timeline 700, and may be made by a base station, such as one of the base stations described with reference to FIG. 1. The resource allocations on the uplink are shown below the timeline 700, and may be made by the base station and used by one or more UEs, such as one or more of the UEs described with reference to FIG. 1.

The transmissions on the downlink may include various types of transmissions, including, for example, DRS transmissions. By way of example, FIG. 7 shows the transmissions on the downlink to include singular directional DRS transmissions 705 (e.g., a first directional DRS transmission 705-*a* and a second directional DRS transmission 705-*b*). Each directional DRS transmission 705 may be associated with one of a plurality of beams. For example, the first directional DRS transmission 705-*a* may be made on a first beam, and the second directional DRS transmission 705-*b* may be made on a second beam. In some examples, each of the directional DRS transmissions 705 may be transmitted during a different instance of a periodic CET period. In some examples, the transmissions on the uplink may also or alternatively include multi-beam DRS transmissions. Multi-beam DRS transmissions may or may not be used to schedule the directional DRS transmission 705.

The directional DRS transmissions 705 may be made over a licensed radio frequency spectrum band or an unlicensed (or shared) radio frequency spectrum band. When the directional DRS transmissions 705 are made over an unlicensed (or shared) radio frequency spectrum band, and in some examples, each directional DRS transmission 705 may be made during a different CET period. During the CET period, the base station does not need to perform a LBT procedure to contend for access to the unlicensed (or shared) radio frequency spectrum band. Alternatively, the directional DRS transmissions 705 may be made outside CET periods, and the base station may need to perform one or more LBT procedures before making each of the transmissions. In some examples, a set of directional DRS transmissions may be transmitted at predetermined or scheduled times offset from a multi-beam DRS transmission.

The resource allocations on the uplink may include resource allocations 720 for a periodic directional (e.g., single beam) uplink subframe 715 (e.g., a first uplink subframe 715-*a* or a second uplink subframe 715-*b*). The resource allocations 720 may include a first resource allocation 720-*a* for a first directional uplink subframe configured for uplink transmissions on a first beam, and a second resource allocation 720-*b* for a second directional uplink subframe configured for uplink transmissions on a second beam. The resource allocations 720 on the uplink may be made for a licensed radio frequency spectrum band or an unlicensed (or shared) radio frequency spectrum band. When resources for a directional uplink subframe 715 are allocated in an unlicensed (or shared) radio frequency spectrum band, a UE may be required to perform one or more LBT procedures prior to transmitting on the resources. When a result of a LBT procedure indicates that the unlicensed (or shared) radio frequency spectrum band or a channel thereof is unavailable, a UE may be unable to transmit in the directional uplink subframe 715. In some cases, one or more UEs may be able transmit in a directional uplink subframe 715, and one or more other UEs may not be able to transmit in the directional uplink subframe 715.

In some examples, a directional DRS transmission 705 (or multi-beam DRS transmission) may include timing information for a periodic directional uplink subframe 715 or an instance thereof, and a time-frequency resource configuration for the periodic directional uplink subframe 715 or an instance thereof. The timing information and time-frequency resource configuration enable the base station to monitor (i.e., listen) for uplink transmissions on a particular beam at a particular time within a particular directional uplink subframe 715. The timing information may include a timing offset of the directional uplink subframe 715 relative to the directional DRS transmission 705. In some examples, each directional DRS transmission 705 may include a relative timing offset between a start (or other reference point) of the instance of the directional DRS transmission 705 and a start (or other reference point) of an instance of the directional uplink subframe 715.

The time-frequency resource configuration for the periodic directional uplink subframe 715 or an instance thereof may identify a correspondence between a receive beam of the base station and a set of time-frequency of the uplink subframe 715.

A UE may select a set of time-frequency resources of a directional uplink subframe 715 on which to transmit. The set of time-frequency resources (or directional uplink subframe 715) may be selected based at least in part on a transmit beam of the UE. The set of time-frequency resources may also be selected based at least in part on a correspondence of the transmit beam to a receive beam of the base station (e.g., based at least in part on a beam training process that pairs a transmit beam of the UE with a receive beam of the base station), and on a correspondence of the receive beam to the selected set of time-frequency resources. In some examples, the UE may select multiple sets of time-frequency resources in multiple directional uplink subframes 715 on which to transmit, and may transmit on the time-frequency resources using different transmit beams.

A UE may transmit a grantless transmission on the selected set of time-frequency resources (or in a selected directional uplink subframe 715.

FIG. 7 shows one example of how timing information and a time-frequency resource configuration for a directional uplink subframe 715 may be transmitted (or signaled) to a UE. In some examples, a portion or all of the timing information and time-frequency resource configuration for a directional uplink subframe 715 may be transmitted (or signaled) in system information (e.g., in a SIB).

FIG. 7 also shows an example in which the timing information for a directional uplink subframe 715 includes a timing offset of the uplink subframe relative to a directional DRS transmission. In some examples, the timing information for a directional uplink subframe may include a semi-statically fixed timing (e.g., an absolute timing, or a timing fixed to a sequence of radio frames). In some examples, the timing information for a directional uplink subframe may include a timing offset of the uplink subframe relative to a trigger transmission (e.g., a transmission sent to poll UEs for uplink transmissions). The trigger transmission may be transmitted/received in a broadcast transmission (e.g., on a PBCH) or a UE-specific transmission. In some examples, a trigger transmission may include a portion (or all) of the timing information or time-frequency resource configuration for a directional uplink subframe. A portion (or all) of the timing information or time-frequency resource configuration for the directional uplink subframe may also be configured prior to the trigger transmission (e.g., in system information).

In some examples, the timing information for a directional uplink subframe 715 may include an indication of a time window 725 in which the directional uplink subframe 715 is to be transmitted. In contrast to a multi-beam uplink subframe, a directional (single-beam) uplink subframe does not require a base station to change its receive beam over the duration of the uplink subframe 715, and thus, a base station that is able to monitor for transmissions on a receive beam for the duration, W, of a time window 725 may indicate a dynamic timing of a directional uplink subframe 715 within the time window 725. In some examples, the timing of the directional uplink subframe 715 within the time window 725 may be dynamically indicated by a trigger transmission 730 on the downlink. The trigger transmission 730 may include timing information for the directional uplink subframe 715, or the base station may signal to UEs, in advance of the trigger transmission 730, that a directional uplink subframe 715 has a particular timing relative to a trigger transmission. UEs may also be preconfigured with a timing relationship between trigger transmissions and directional uplink subframes. In some examples, the beam for which resources are allocated in a directional uplink subframe 715 may be indicated by the beam on which the trigger transmission 730 is transmitted or received.

In some examples, the time-frequency resource configuration for a directional uplink subframe 715 may also identify a correspondence between at least one transmission type and at least one set of time-frequency resources in a directional uplink subframes 715. For example, different bandwidths (i.e., frequency ranges) of time-frequency resources may be allocated to different transmission types (e.g., a first 20 MHz of a 100 MHz bandwidth may be allocated to random access transmissions, a second 20 MHz of the 100 MHz bandwidth may be allocated to ACK/NACK transmissions, etc.). As another example, different CDM codes may be allocated to different transmissions types. As another example, different OCCs may be allocated to different transmission types. In some examples, the transmission types may include at least one of an ACK/NACK transmission type, a random access transmission type, a CQI transmission type, a SR transmission type, a SRS transmission type, a grantless PUSCH transmission type, or a combination thereof.

In some examples, the time-frequency resource configuration for a directional uplink subframe 715 may also identify a correspondence between at least one UE and the at least one set of time-frequency resources in one or more sets of time-frequency resources of the directional uplink subframe 715. For example, different bandwidths, CDM codes, OCCs, or a combination thereof may be allocated to different UEs, or some bandwidths, CDM codes, OCCs, or a combination thereof may be allocated for use by any UE (or by a subset of UEs).

In some examples, a correspondence between receive beams, transmission types, and UEs may be defined. For example, a first bandwidth of a beam for which resources are allocated in a directional uplink subframe 715 may be allocated for random access transmissions by any UE, and/or a second bandwidth of the beam may be allocated to a single UE or subset of UEs for any type of grantless transmission the UE(s) have to transmit. Placing limits on the bandwidth(s) in which a UE may transmit within a directional uplink subframe 715 can reduce the frequencies for which the UE may need to perform a LBT procedure and increase its chances of succeeding in the LBT procedure.

Figure 8:
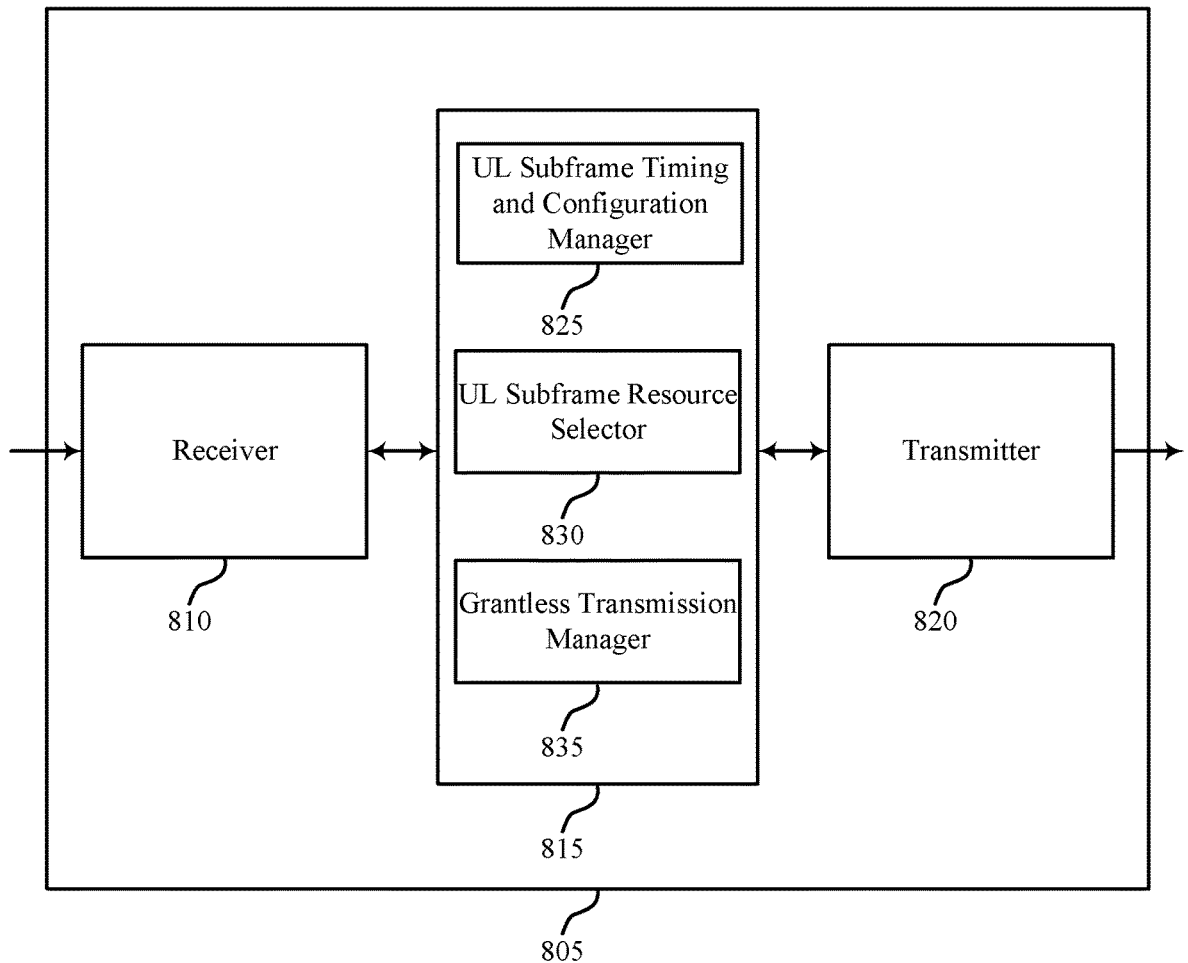
FIG. 8 shows a block diagram of an apparatus for use in wireless communication, in accordance with various aspects of the present disclosure.

FIG. 8 shows a block diagram 800 of an apparatus 805 for use in wireless communication, in accordance with various aspects of the present disclosure. The apparatus 805 may be an example of aspects of a UE described with reference to FIG. 1 or 2. The apparatus 805 may include a receiver 810, a wireless communication manager 815, and a transmitter 820. The apparatus 805 may also include a processor. Each of these components may be in communication with one another (e.g., via one or more buses).

The receiver 810 may receive data or control signals or information (i.e., transmissions), some or all of which may be associated with various information channels (e.g., data channels, control channels, etc.). Received signals or information, or measurements performed thereon, may be passed to other components of the apparatus 805. The receiver 810 may include a single antenna or a set of antennas.

The wireless communication manager 815 and/or at least some of its various sub-components may be implemented in hardware, software executed by a processor, firmware, or any combination thereof. If implemented in software executed by a processor, the functions of the wireless communication manager 815 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The wireless communication manager 815 and/or at least some of its various sub-components may be physically located at various positions, including being distributed such that portions of functions are implemented at different physical locations by one or more physical devices. In some examples, the wireless communication manager 815 and/or at least some of its various sub-components may be a separate and distinct component in accordance with various aspects of the present disclosure. In other examples, the wireless communication manager 815 and/or at least some of its various sub-components may be combined with one or more other hardware components, including but not limited to an I/O component, a transceiver, another computing device, one or more other components described in the present disclosure, or a combination thereof, in accordance with various aspects of the present disclosure. The wireless communication manager 815 may be an example of aspects of the wireless communication manager described with reference to FIG. 1. The wireless communication manager 815 may include a UL subframe timing and configuration manager 825, a UL subframe resource selector 830, and a grantless transmission manager 835.

The UL subframe timing and configuration manager 825 may be used to receive timing information for an uplink subframe and a time-frequency resource configuration for the uplink subframe, as described for example with reference to FIGS. 3-7. The time-frequency resource configuration may identify a correspondence between at least one receive beam in a set of one or more receive beams and at least one set of time-frequency resources in one or more sets of time-frequency resources of the uplink subframe. In some examples, receiving the timing information for the uplink subframe may include receiving an indication of a fixed timing of the uplink subframe, a first timing offset of the uplink subframe relative to a DRS transmission, or a second timing offset of the uplink subframe relative to a trigger transmission.

The UL subframe resource selector 830 may be used to select at least a first set of time-frequency resources of the uplink subframe on which to transmit, as described for example with reference to FIGS. 3-7. The first set of time-frequency resources may be selected based at least in part on a transmit beam of the UE, a correspondence of the transmit beam to a receive beam in the set of one or more receive beams, and a correspondence of the receive beam to the selected first set of time-frequency resources.

The grantless transmission manager 835 may be used to transmit a grantless transmission on at least the first set of time-frequency resources, as described for example with reference to FIGS. 3-7.

The transmitter 820 may transmit data or control signals or information (i.e., transmissions) generated by other components of the apparatus 805, some or all of which may be associated with various information channels (e.g., data channels, control channels, etc.). In some examples, the transmitter 820 may be collocated with the receiver 810 in a transceiver. For example, the transmitter 820 and receiver 810 may be an example of aspects of the transceiver 1230 or 1350 described with reference to FIG. 12 or 13. The transmitter 820 may include a single antenna or a set of antennas.

Figure 9:
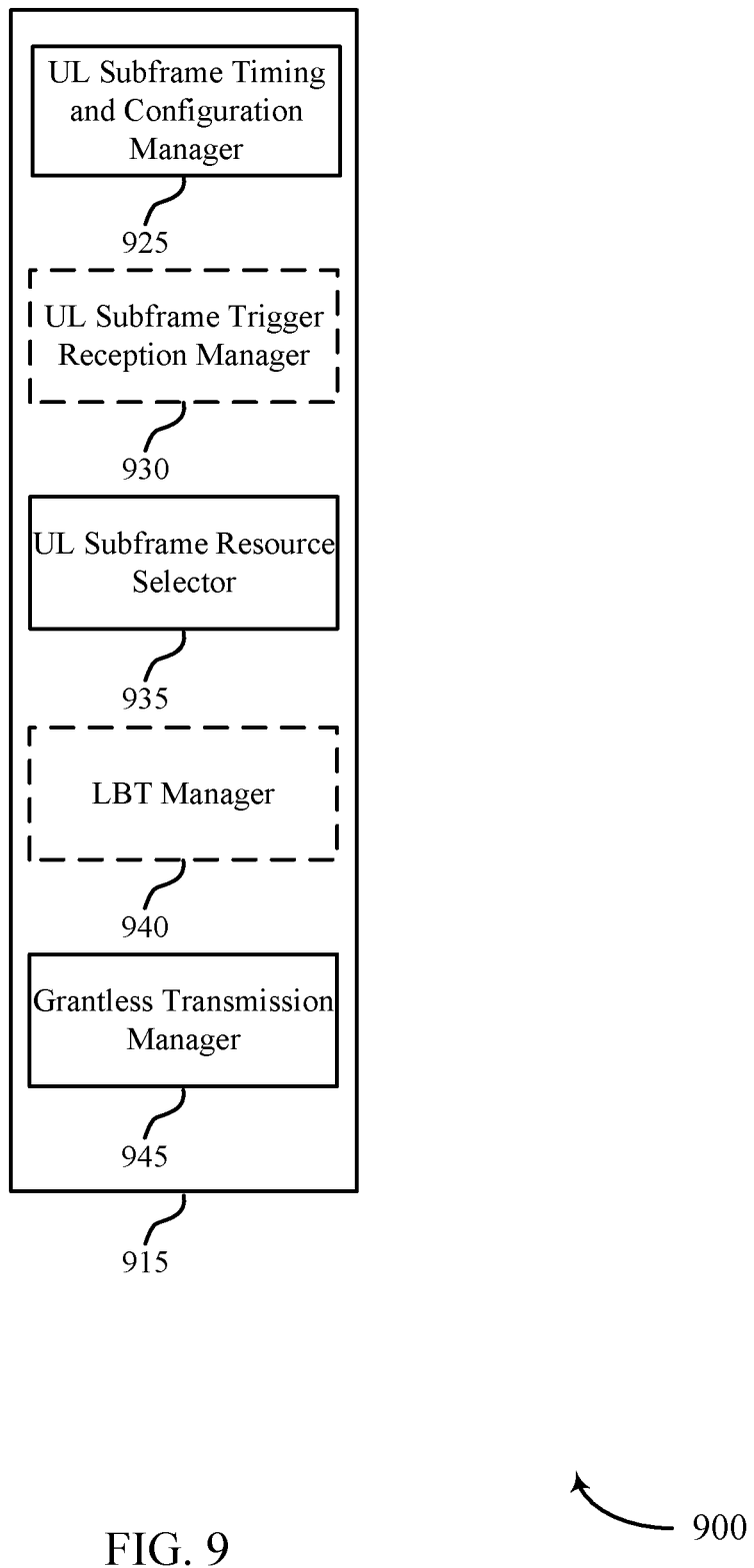
FIG. 9 shows a block diagram of a wireless communication manager, in accordance with various aspects of the present disclosure.

FIG. 9 shows a block diagram 900 of a wireless communication manager 915, in accordance with various aspects of the present disclosure. The wireless communication manager 915 may be an example of aspects of the wireless communication manager described with reference to FIG. 8. The wireless communication manager 915 may include a UL subframe timing and configuration manager 925, an optional UL subframe trigger reception manager 930, a UL subframe resource selector 935, an optional LBT manager 940, and a grantless transmission manager 945. Each of these components may communicate, directly or indirectly, with one another (e.g., via one or more buses). The UL subframe timing and configuration manager 925, UL subframe resource selector 935, and grantless transmission manager 945 may be examples of the UL subframe timing and configuration manager 825, UL subframe resource selector 830, and grantless transmission manager 835 described with reference to FIG. 8.

The UL subframe timing and configuration manager 925 may be used to receive timing information for an uplink subframe and a time-frequency resource configuration for the uplink subframe (e.g., in system information or a DRS transmission), as described for example with reference to FIGS. 3-7. The time-frequency resource configuration may identify a correspondence between at least one receive beam in a set of one or more receive beams and at least one set of time-frequency resources in one or more sets of time-frequency resources of the uplink subframe. In some examples, receiving the timing information for the uplink subframe may include receiving an indication of a fixed timing of the uplink subframe, a first timing offset of the uplink subframe relative to a DRS transmission, or a second timing offset of the uplink subframe relative to a trigger transmission.

The UL subframe trigger reception manager 930 may be used to receive a trigger transmission in at least one of a broadcast transmission or a UE-specific transmission, as described for example with reference to FIG. 3 or 7. In some examples, the trigger transmission may include at least a portion of the time-frequency resource configuration for the uplink subframe.

The UL subframe resource selector 935 may be used to select at least a first set of time-frequency resources of the uplink subframe on which to transmit, as described for example with reference to FIGS. 3-7. The first set of time-frequency resources may be selected based at least in part on a transmit beam of the UE, a correspondence of the transmit beam to a receive beam in the set of one or more receive beams, and a correspondence of the receive beam to the selected first set of time-frequency resources.

The LBT manager 940 may be used to perform a LBT procedure prior to the grantless transmission manager 945 transmitting, as described for example with reference to FIGS. 3-7. In some examples, the LBT manager 940 may additionally or alternatively be used to determine, based at least in part on a transmission type, whether to perform a LBT procedure prior to the grantless transmission manager 945 transmitting. In some examples, the LBT procedure may be performed at least one of: for at least one beam direction and prior to all of the one or more sets of time-frequency resources corresponding to the one or more receive beams, for all of the beam directions and prior to all of the one or more sets of time-frequency resources corresponding to the one or more receive beams, or for at least the transmit beam or the receive beam and in a LBT gap prior to the first set of time-frequency resources. In some examples, the LBT manager 940 may be further used to select a type of the LBT procedure based at least in part on a transmission type.

The grantless transmission manager 945 may be used to transmit a grantless transmission on at least the first set of time-frequency resources, as described for example with reference to FIGS. 3-7.

In some examples of the wireless communication manager 915, the time-frequency resource configuration for the uplink subframe may further identify a correspondence between at least one transmission type and the at least one set of time-frequency resources in the one or more sets of time-frequency resources of the uplink subframe. In these examples, the UL subframe resource selector 935 may be further used to select the first set of time-frequency resources of the uplink subframe based at least in part on a first transmission type of the UE, and on a correspondence between the first transmission type and the first set of time-frequency resources of the uplink subframe. In some examples, the at least one transmission type may include at least one of an ACK/NACK transmission type, a random access transmission type, a CQI transmission type, a SR transmission type, a SRS transmission type, a grantless PUSCH transmission type, or a combination thereof. In some examples, the correspondence between the at least one transmission type and the at least one set of time-frequency resources may be based at least in part on: a first pre-allocation of different bandwidths to different transmission types, a second pre-allocation of different CDM codes to different transmission types, a third pre-allocation of different OCCs to different transmission types, or a combination thereof.

In some examples of the wireless communication manager 915, the time-frequency resource configuration for the uplink subframe may further identify a correspondence between at least one UE and the at least one set of time-frequency resources in one or more sets of time-frequency resources of the uplink subframe. In these examples, the UL subframe resource selector 935 may be further used to select the first set of time-frequency resources of the uplink subframe based at least in part on the UE, and on a correspondence between the UE and the first set of time-frequency resources of the uplink subframe.

In some examples of the wireless communication manager 915, the uplink subframe may be a multi-beam subframe, and the correspondence between the at least one receive beam and the at least one set of time-frequency resources may include a correspondence between a plurality of receive beams and a plurality of sets of time-frequency resources. In some examples, the time-frequency resource configuration may identify at least one of a first timing of a first LBT gap associated with more than one receive beam, a second timing of a second LBT gap associated with a single receive beam, a transmission start time associated with at least one of the plurality of receive beams, or a combination thereof.

In some examples of the wireless communication manager 915, the uplink subframe may be a single-beam subframe, and the correspondence between the at least one receive beam and the at least one set of time-frequency resources may include a correspondence between a single receive beam and a single set of time-frequency resources. In some examples, the timing information for the uplink subframe may include an indication of a time window in which the uplink subframe is to be transmitted. In some examples, the UL subframe trigger reception manager 930 may be used to receive a trigger transmission on the receive beam during the time window, in which case the timing information for the uplink subframe may be relative to the trigger transmission.

Figure 10:
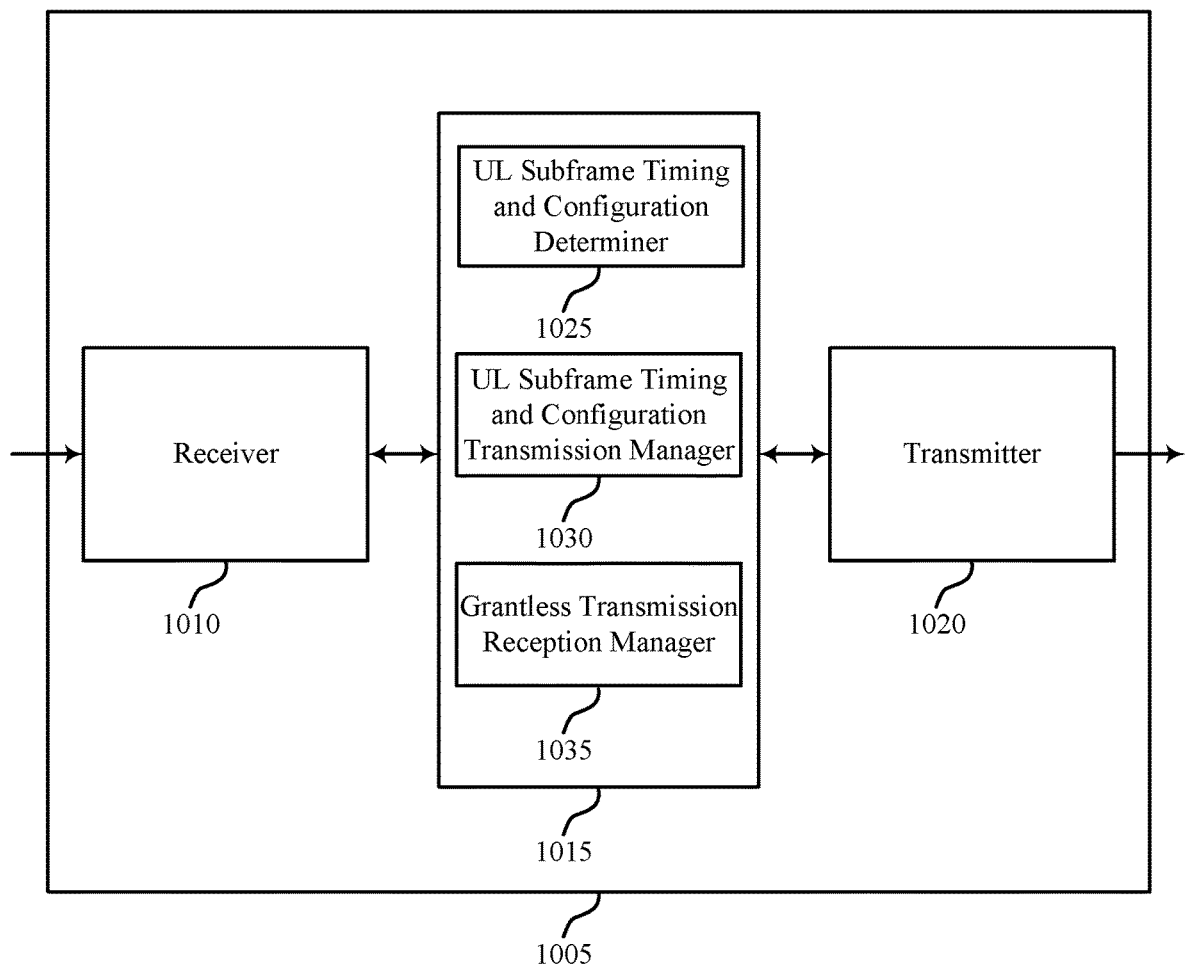
FIG. 10 shows a block diagram of an apparatus for use in wireless communication, in accordance with various aspects of the present disclosure.

FIG. 10 shows a block diagram 1000 of an apparatus 1005 for use in wireless communication, in accordance with various aspects of the present disclosure. The apparatus 1005 may be an example of aspects of a base station described with reference to FIG. 1 or 2. The apparatus 1005 may include a receiver 1010, a wireless communication manager 1015, and a transmitter 1020. The apparatus 1005 may also include a processor. Each of these components may be in communication with one another (e.g., via one or more buses).

The receiver 1010 may receive data or control signals or information (i.e., transmissions), some or all of which may be associated with various information channels (e.g., data channels, control channels, etc.). Received signals or information, or measurements performed thereon, may be passed to other components of the apparatus 1005. The receiver 1010 may include a single antenna or a set of antennas.

The wireless communication manager 1015 and/or at least some of its various sub-components may be implemented in hardware, software executed by a processor, firmware, or any combination thereof. If implemented in software executed by a processor, the functions of the wireless communication manager 1015 and/or at least some of its various sub-components may be executed by a general-purpose processor, a DSP, an ASIC, a FPGA or other programmable logic device, discrete gate or transistor logic, discrete hardware components, or any combination thereof designed to perform the functions described in the present disclosure.

The wireless communication manager 1015 and/or at least some of its various sub-components may be physically located at various positions, including being distributed such that portions of functions are implemented at different physical locations by one or more physical devices. In some examples, the wireless communication manager 1015 and/or at least some of its various sub-components may be a separate and distinct component in accordance with various aspects of the present disclosure. In other examples, the wireless communication manager 1015 and/or at least some of its various sub-components may be combined with one or more other hardware components, including but not limited to an I/O component, a transceiver, another computing device, one or more other components described in the present disclosure, or a combination thereof, in accordance with various aspects of the present disclosure. The wireless communication manager 1015 may be an example of aspects of the wireless communication manager described with reference to FIG. 1. The wireless communication manager 1015 may include a UL subframe timing and configuration determiner 1025, a UL subframe timing and configuration transmission manager 1030, and a grantless transmission reception manager 1035.

The UL subframe timing and configuration determiner 1025 may be used to determine timing information for an uplink subframe and a time-frequency resource configuration for the uplink subframe, as described for example with reference to FIGS. 3-7. The time-frequency resource configuration may identify a correspondence between at least one receive beam in a set of one or more receive beams and at least one set of time-frequency resources in one or more sets of time-frequency resources of the uplink subframe. In some examples, the timing information for the uplink subframe may include an indication of a fixed timing of the uplink subframe, a first timing offset of the uplink subframe relative to a DRS transmission, or a second timing offset of the uplink subframe relative to a trigger transmission.

The UL subframe timing and configuration transmission manager 1030 may be used to transmit the timing information for the uplink subframe and the time-frequency resource configuration for the uplink subframe, as described for example with reference to FIGS. 3-7.

The grantless transmission reception manager 1035 may be used to monitor for transmissions on the at least one receive beam in accordance with the correspondence between the at least one receive beam and the at least one set of time-frequency resources, as described for example with reference to FIGS. 3-7.

The transmitter 1020 may transmit data or control signals or information (i.e., transmissions) generated by other components of the apparatus 1005, some or all of which may be associated with various information channels (e.g., data channels, control channels, etc.). In some examples, the transmitter 1020 may be collocated with the receiver 1010 in a transceiver. For example, the transmitter 1020 and receiver 1010 may be an example of aspects of the transceiver 1230 or 1350 described with reference to FIG. 12 or 13. The transmitter 1020 may include a single antenna or a set of antennas.

Figure 11:
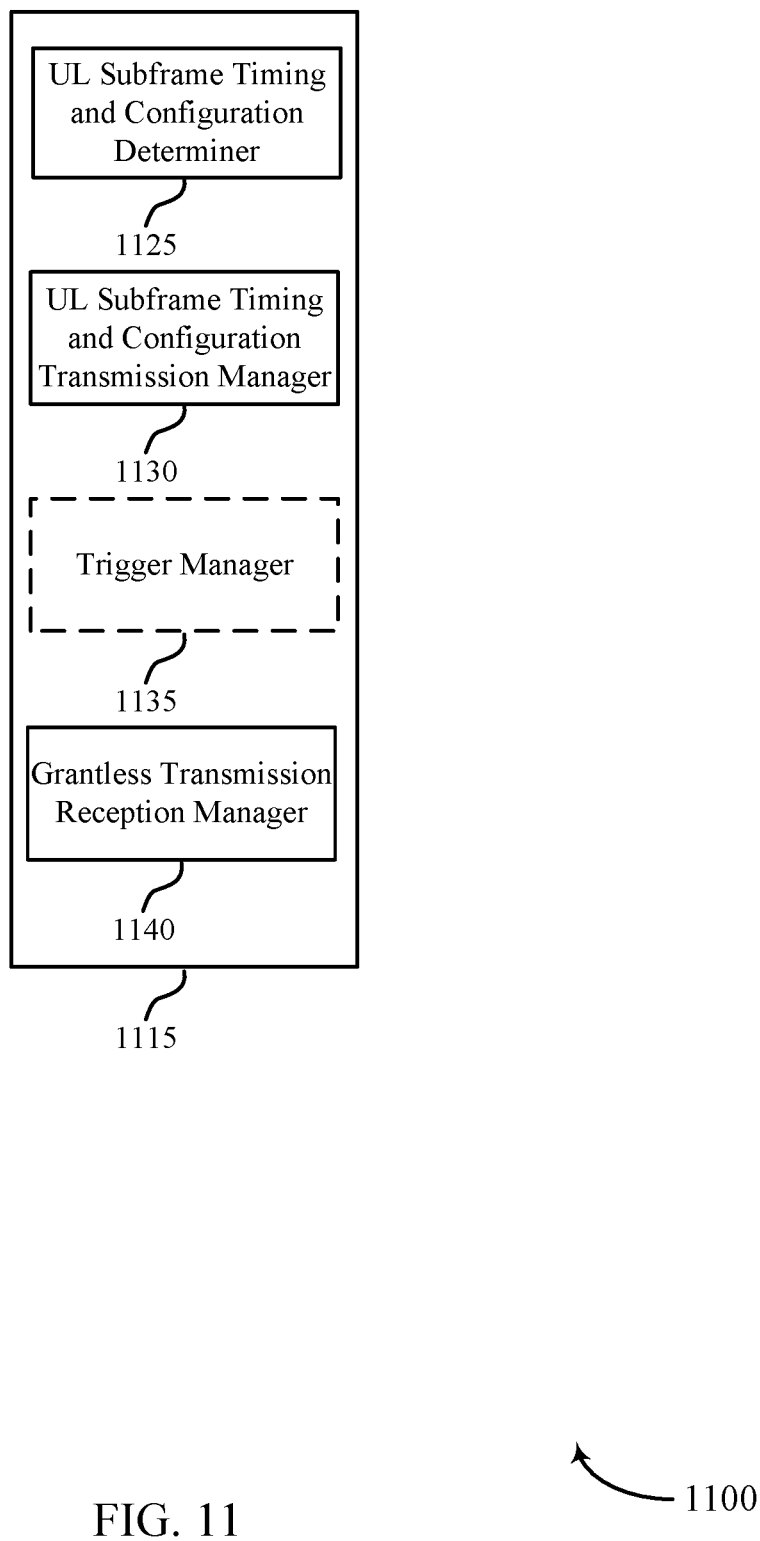
FIG. 11 shows a block diagram of a wireless communication manager, in accordance with various aspects of the present disclosure.

FIG. 11 shows a block diagram 1100 of a wireless communication manager 1115, in accordance with various aspects of the present disclosure. The wireless communication manager 1115 may be an example of aspects of the wireless communication manager described with reference to FIG. 10. The wireless communication manager 1115 may include a UL subframe timing and configuration determiner 1125, a UL subframe timing and configuration transmission manager 1130, an optional trigger manager 1135, and a grantless transmission reception manager 1140. Each of these components may communicate, directly or indirectly, with one another (e.g., via one or more buses). The UL subframe timing and configuration determiner 1125, UL subframe timing and configuration transmission manager 1130, and grantless transmission reception manager 1140 may be examples of the UL subframe timing and configuration determiner 1025, UL subframe timing and configuration transmission manager 1030, and grantless transmission reception manager 1035 described with reference to FIG. 10.

The UL subframe timing and configuration determiner 1025 may be used to determine timing information for an uplink subframe and a time-frequency resource configuration for the uplink subframe, as described for example with reference to FIGS. 3-7. The time-frequency resource configuration may identify a correspondence between at least one receive beam in a set of one or more receive beams and at least one set of time-frequency resources in one or more sets of time-frequency resources of the uplink subframe. In some examples, the timing information for the uplink subframe may include an indication of a fixed timing of the uplink subframe, a first timing offset of the uplink subframe relative to a DRS transmission, or a second timing offset of the uplink subframe relative to a trigger transmission.

The UL subframe timing and configuration transmission manager 1030 may be used to transmit the timing information for the uplink subframe and the time-frequency resource configuration for the uplink subframe (e.g., in system information or a DRS transmission), as described for example with reference to FIGS. 3-7.

The trigger manager 1135 may be used to transmit a trigger transmission in at least one of a broadcast transmission or a UE-specific transmission, as described for example with reference to FIG. 3 or 7. In some examples, the trigger transmission may include at least a portion of the time-frequency resource configuration for the uplink subframe.

The grantless transmission reception manager 1035 may be used to monitor for transmissions on the at least one receive beam in accordance with the correspondence between the at least one receive beam and the at least one set of time-frequency resources, as described for example with reference to FIGS. 3-7.

In some examples of the wireless communication manager 1115, the time-frequency resource configuration for the uplink subframe may further identify a correspondence between at least one transmission type and the at least one set of time-frequency resources in the one or more sets of time-frequency resources of the uplink subframe. In some examples, the at least one transmission type may include at least one of an ACK/NACK transmission type, a random access transmission type, a CQI transmission type, a SR transmission type, a SRS transmission type, a grantless PUSCH transmission type, or a combination thereof. In some examples, the correspondence between the at least one transmission type and the at least one set of time-frequency resources may be based at least in part on a first allocation of different bandwidths to different transmission types, a second allocation of different CDM codes to different transmission types, a third allocation of different OCCs to different transmission types, or a combination thereof.

In some examples of the wireless communication manager 1115, the time-frequency resource configuration for the uplink subframe may further identify a correspondence between at least one UE and the at least one set of time-frequency resources in one or more sets of time-frequency resources of the uplink subframe.

In some examples of the method 1700, the time-frequency resource configuration for the uplink subframe may further include a first LBT gap allocated for at least one beam direction and located prior to all of the one or more sets of time-frequency resources corresponding to the one or more receive beams, a second LBT gap allocated for all of the beam directions and located prior to all of the one or more sets of time-frequency resources corresponding to the one or more receive beams, or a third LBT gap allocated for a single beam direction and located prior to a set of time-frequency resources corresponding to the single beam direction.

In some examples of the wireless communication manager 1115, the uplink subframe may include a multi-beam subframe, and the correspondence between the at least one receive beam and the at least one set of time-frequency resources may include a correspondence between a plurality of receive beams and a plurality of sets of time-frequency resources. In some examples, the time-frequency resource configuration may identify at least one of a first timing of a first LBT gap associated with more than one receive beam, a second timing of a second LBT gap associated with a single receive beam, a transmission start time associated with at least one of the plurality of receive beams, or a combination thereof.

In some examples of the wireless communication manager 1115, the uplink subframe may include a single-beam subframe, and the correspondence between the at least one receive beam and the at least one set of time-frequency resources may include a correspondence between a single receive beam and a single set of time-frequency resources. In some examples, the timing information for the uplink subframe may include an indication of a time window in which the uplink subframe is to be transmitted. In some examples, the method 1700 may include transmitting a trigger transmission on a receive beam during the time window, with the timing information for the uplink subframe being relative to the trigger transmission.

Figure 12:
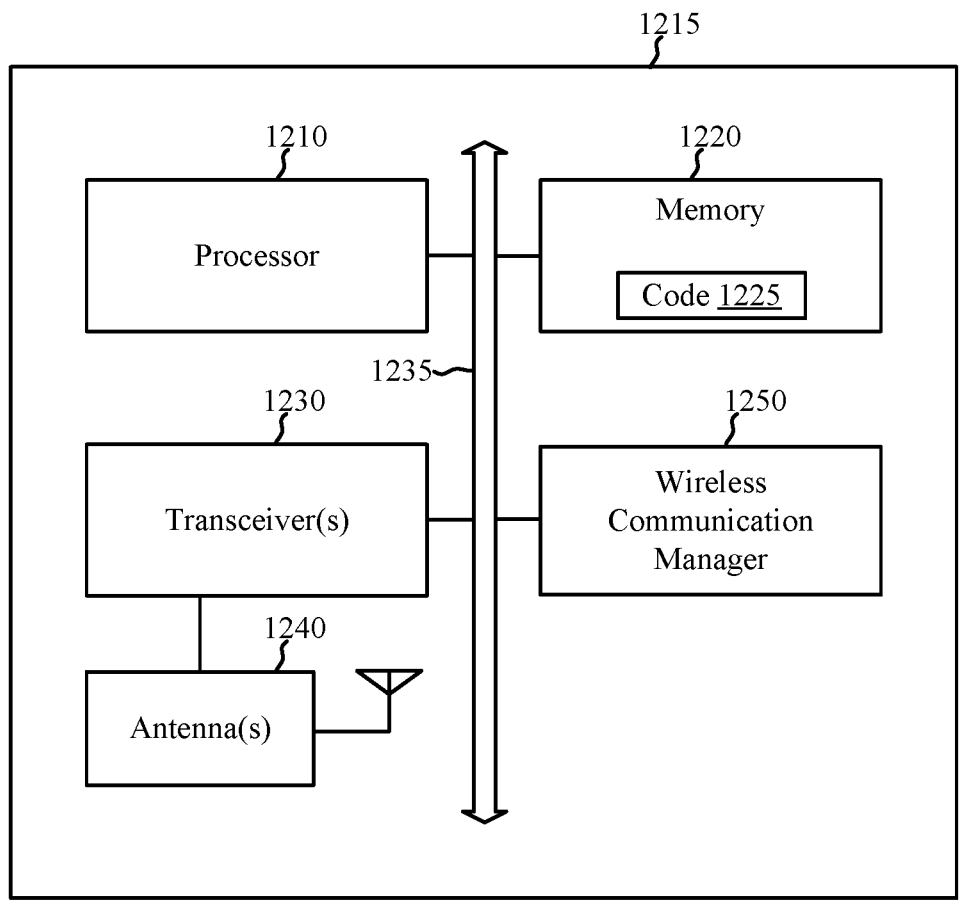
FIG. 12 shows a block diagram of a UE for use in wireless communication, in accordance with various aspects of the present disclosure.

FIG. 12 shows a block diagram 1200 of a UE 1215 for use in wireless communication, in accordance with various aspects of the present disclosure. The UE 1215 may be included or be part of a personal computer (e.g., a laptop computer, a netbook computer, a tablet computer, etc.), a cellular telephone, a PDA, a digital video recorder (DVR), an internet appliance, a gaming console, an e-reader, a vehicle, a home appliance, a lighting or alarm control system, etc. The UE 1215 may, in some examples, have an internal power supply (not shown), such as a small battery, to facilitate mobile operation. In some examples, the UE 1215 may be an example of aspects of one or more of the UEs described with reference to FIG. 1, or aspects of the apparatus described with reference to FIG. 8. The UE 1215 may be configured to implement at least some of the UE or apparatus techniques or functions described with reference to FIGS. 1-9.

The UE 1215 may include a processor 1210, a memory 1220, at least one transceiver (represented by transceiver(s) 1230), antennas 1240 (e.g., an antenna array), or a wireless communication manager 1250. Each of these components may be in communication with each other, directly or indirectly, over one or more buses 1235.

The memory 1220 may include random access memory (RAM) or read-only memory (ROM). The memory 1220 may store computer-readable, computer-executable code 1225 containing instructions that are configured to, when executed, cause the processor 1210 to perform various functions described herein related to wireless communication, including, for example, selecting resources of, and transmitting a grantless transmission in, an uplink subframe. Alternatively, the computer-executable code 1225 may not be directly executable by the processor 1210 but be configured to cause the UE 1215 (e.g., when compiled and executed) to perform various of the functions described herein.

The processor 1210 may include an intelligent hardware device, e.g., a central processing unit (CPU), a microcontroller, an ASIC, etc. The processor 1210 may process information received through the transceiver(s) 1230 or information to be sent to the transceiver(s) 1230 for transmission through the antennas 1240. The processor 1210 may handle, alone or in connection with the wireless communication manager 1250, one or more aspects of communicating over (or managing communications over) one or more radio frequency spectrum bands.

The transceiver(s) 1230 may include a modem configured to modulate packets and provide the modulated packets to the antennas 1240 for transmission, and to demodulate packets received from the antennas 1240. The transceiver(s) 1230 may, in some examples, be implemented as one or more transmitters and one or more separate receivers. The transceiver(s) 1230 may support communications in one or more radio frequency spectrum bands. The transceiver(s) 1230 may be configured to communicate bi-directionally, via the antennas 1240, with one or more base stations or apparatuses, such as one or more of the base stations or apparatus described with reference to FIG. 1 or 2.

The wireless communication manager 1250 may be configured to perform or control some or all of the UE or apparatus techniques or functions described with reference to FIGS. 1-9 related to wireless communication. The wireless communication manager 1250, or portions of it, may include a processor, or some or all of the functions of the wireless communication manager 1250 may be performed by the processor 1210 or in connection with the processor 1210. In some examples, the wireless communication manager 1250 may be an example of the wireless communication manager described with reference to FIG. 8 or 9.

Figure 13:
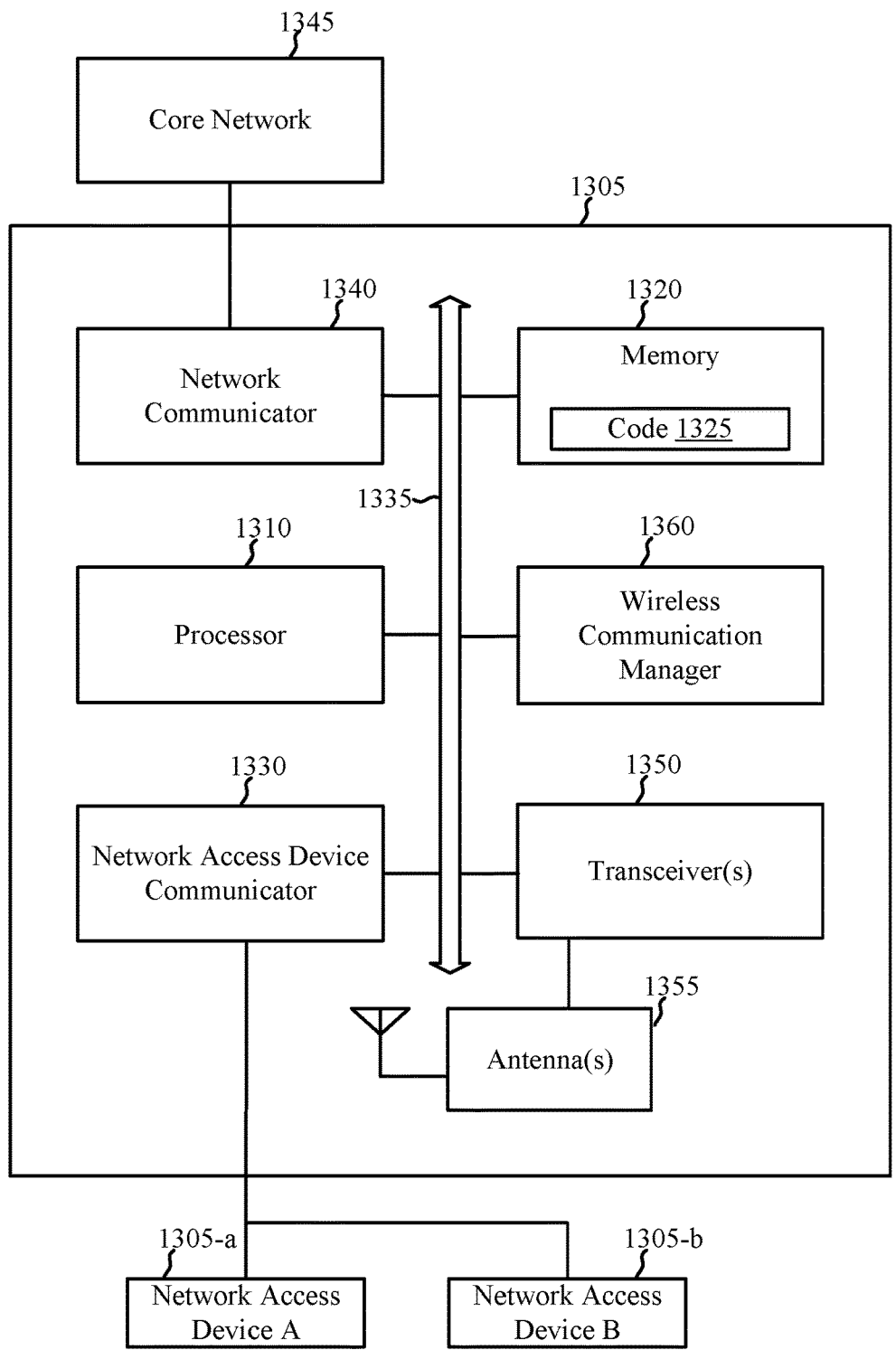
FIG. 13 shows a block diagram of a base station for use in wireless communication, in accordance with various aspects of the present disclosure.

FIG. 13 shows a block diagram 1300 of a base station 1305 for use in wireless communication, in accordance with various aspects of the present disclosure. In some examples, the base station 1305 may be an example of one or more aspects of the base stations described with reference to FIG. 1, or aspects of the apparatus described with reference to FIG. 10. The base station 1305 may be configured to implement or facilitate at least some of the base station or apparatus techniques or functions described with reference to FIGS. 1-7, 10, and 11.

The base station 1305 may include a processor 1310, a memory 1320, at least one transceiver (represented by transceiver(s) 1350), at least one antenna 1355 (e.g., an antenna array), or a wireless communication manager 1360. The base station 1305 may also include one or more of a base station communicator 1330 or a network communicator 1340. Each of these components may be in communication with each other, directly or indirectly, over one or more buses 1335.

The memory 1320 may include RAM or ROM. The memory 1320 may store computer-readable, computer-executable code 1325 containing instructions that are configured to, when executed, cause the processor 1310 to perform various functions described herein related to wireless communication, including, for example, configuring, and receiving a grantless transmission in, an uplink subframe. Alternatively, the computer-executable code 1325 may not be directly executable by the processor 1310 but be configured to cause the base station 1305 (e.g., when compiled and executed) to perform various of the functions described herein.

The processor 1310 may include an intelligent hardware device, e.g., a CPU, a microcontroller, an ASIC, etc. The processor 1310 may process information received through the transceiver(s) 1350, the base station communicator 1330, or the network communicator 1340. The processor 1310 may also process information to be sent to the transceiver(s) 1350 for transmission through the antennas 1355, or to the base station communicator 1330 for transmission to one or more other base stations (e.g., base station 1305-*a* and base station 1305-*b*), or to the network communicator 1340 for transmission to a core network 1345, which may be an example of one or more aspects of the core network 130 described with reference to FIG. 1. The processor 1310 may handle, alone or in connection with the wireless communication manager 1360, one or more aspects of communicating over (or managing communications over) one or more radio frequency spectrum bands.

The transceiver(s) 1350 may include a modem configured to modulate packets and provide the modulated packets to the antennas 1355 for transmission, and to demodulate packets received from the antennas 1355. The transceiver(s) 1350 may, in some examples, be implemented as one or more transmitters and one or more separate receivers. The transceiver(s) 1350 may support communications in one or more radio frequency spectrum bands. The transceiver(s) 1350 may be configured to communicate bi-directionally, via the antennas 1355, with one or more UEs or apparatuses, such as one or more of the UEs or apparatus described with reference to FIG. 1, 2, 10, or 12. The base station 1305 may communicate with the core network 1345 through the network communicator 1340. The base station 1305 may also communicate with other base stations, such as the base station 1305-*a* and the base station 1305-*b*, using the base station communicator 1330.

The wireless communication manager 1360 may be configured to perform or control some or all of the base station or apparatus techniques or functions described with reference to FIGS. 1-7, 10, and 11 related to wireless communication. The wireless communication manager 1360, or portions of it, may include a processor, or some or all of the functions of the wireless communication manager 1360 may be performed by the processor 1310 or in connection with the processor 1310. In some examples, the wireless communication manager 1360 may be an example of the wireless communication manager described with reference to FIG. 10 or 11.

Figure 14:
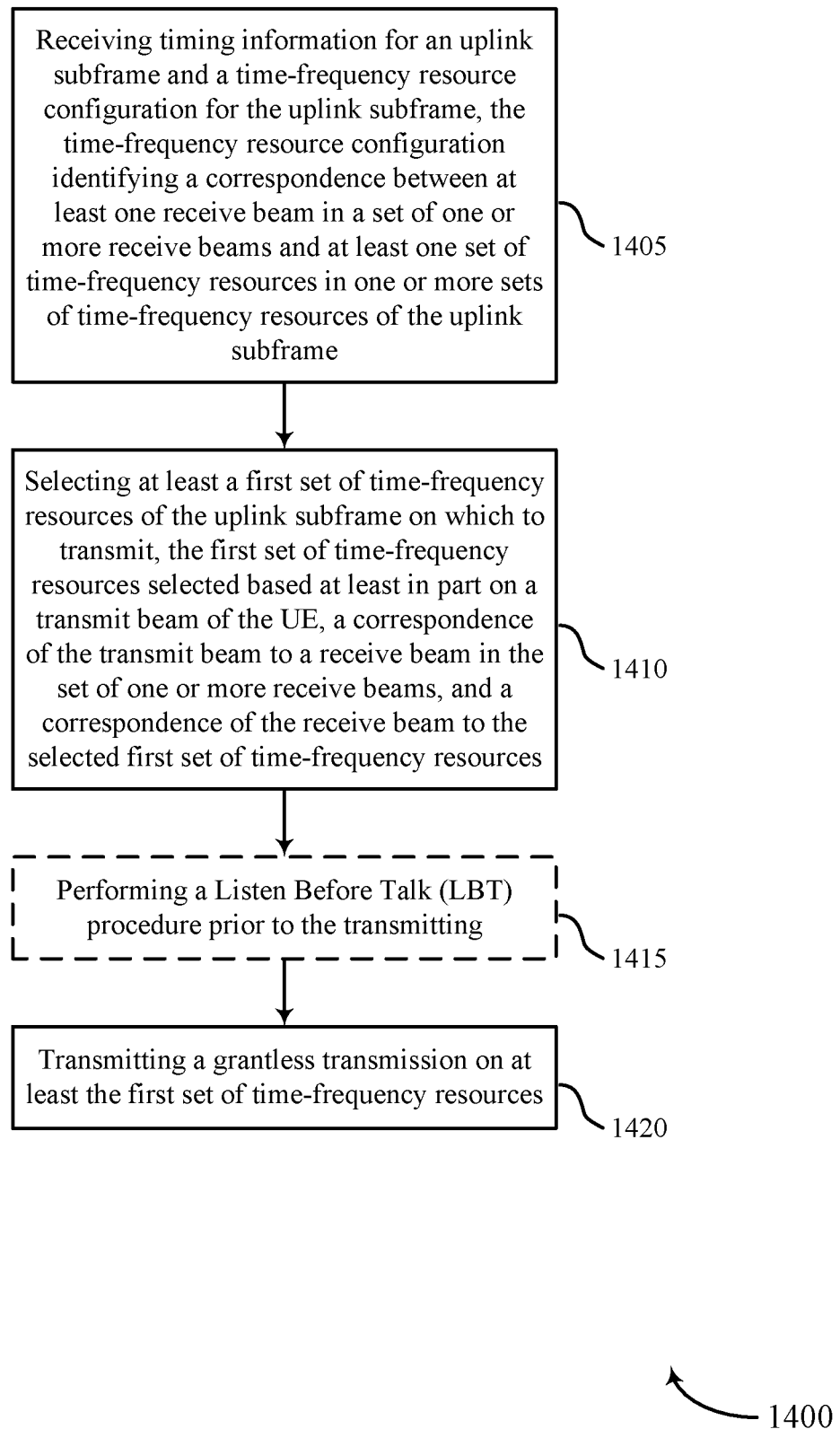
FIGS. 14-16 are flow charts illustrating examples of methods for wireless communication at a UE, in accordance with various aspects of the present disclosure.

FIG. 14 is a flow chart illustrating an example of a method 1400 for wireless communication at a UE, in accordance with various aspects of the present disclosure. For clarity, the method 1400 is described below with reference to aspects of one or more of the UEs described with reference to FIG. 1, 2, or 12, aspects of the apparatus described with reference to FIG. 8, or aspects of one or more of the wireless communication managers described with reference to FIG. 8, 9, or 12. In some examples, a UE may execute one or more sets of codes to control the functional elements of the UE to perform the functions described below. Additionally or alternatively, the UE may perform one or more of the functions described below using special-purpose hardware.

At block 1405, the method 1400 may include receiving timing information for an uplink subframe and a time-frequency resource configuration for the uplink subframe, as described for example with reference to FIGS. 3-7. The time-frequency resource configuration may identify a correspondence between at least one receive beam in a set of one or more receive beams and at least one set of time-frequency resources in one or more sets of time-frequency resources of the uplink subframe. In some examples, receiving the timing information for the uplink subframe may include receiving an indication of a fixed timing of the uplink subframe, a first timing offset of the uplink subframe relative to a DRS transmission, or a second timing offset of the uplink subframe relative to a trigger transmission. In some examples, the operation(s) at block 1405 may be performed using the UL subframe timing and configuration manager described with reference to FIG. 8 or 9.

At block 1410, the method 1400 may include selecting at least a first set of time-frequency resources of the uplink subframe on which to transmit, as described for example with reference to FIGS. 3-7. The first set of time-frequency resources may be selected based at least in part on a transmit beam of the UE, a correspondence of the transmit beam to a receive beam in the set of one or more receive beams, and a correspondence of the receive beam to the selected first set of time-frequency resources. In some examples, the operation(s) at block 1410 may be performed using the UL subframe resource selector described with reference to FIG. 8 or 9.

At block 1415, the method 1400 may optionally include performing a LBT procedure prior to the transmitting in block 1420, as described for example with reference to FIGS. 3-7. In some examples, the method 1400 may additionally or alternatively include determining, based at least in part on a transmission type, whether to perform a LBT procedure prior to the transmitting in block 1420. In some examples, the LBT procedure may be performed at least one of: for at least one beam direction and prior to all of the one or more sets of time-frequency resources corresponding to the one or more receive beams, for all of the beam directions and prior to all of the one or more sets of time-frequency resources corresponding to the one or more receive beams, or for at least the transmit beam or the receive beam and in a LBT gap prior to the first set of time-frequency resources. In some examples, the method 1400 may further include selecting a type of the LBT procedure based at least in part on a transmission type. In some examples, the operation(s) at block 1415 may be performed using the LBT manager described with reference to FIG. 9.

At block 1420, the method 1400 may include transmitting a grantless transmission on at least the first set of time-frequency resources, as described for example with reference to FIGS. 3-7. In some examples, the operation(s) at block 1420 may be performed using the grantless transmission manager described with reference to FIG. 8 or 9.

In some examples of the method 1400, the time-frequency resource configuration for the uplink subframe may further identify a correspondence between at least one transmission type and the at least one set of time-frequency resources in the one or more sets of time-frequency resources of the uplink subframe. In these examples, the first set of time-frequency resources of the uplink subframe may be further selected based at least in part on a first transmission type of the UE, and on a correspondence between the first transmission type and the first set of time-frequency resources of the uplink subframe. In some examples, the at least one transmission type may include at least one of an ACK/NACK transmission type, a random access transmission type, a CQI transmission type, a SR transmission type, a SRS transmission type, a grantless PUSCH transmission type, or a combination thereof. In some examples, the correspondence between the at least one transmission type and the at least one set of time-frequency resources may be based at least in part on: a first pre-allocation of different bandwidths to different transmission types, a second pre-allocation of different CDM codes to different transmission types, a third pre-allocation of different OCCs to different transmission types, or a combination thereof.

In some examples of the method 1400, the time-frequency resource configuration for the uplink subframe may further identify a correspondence between at least one UE and the at least one set of time-frequency resources in one or more sets of time-frequency resources of the uplink subframe. In these examples, the first set of time-frequency resources of the uplink subframe may be further selected based at least in part on the UE, and on a correspondence between the UE and the first set of time-frequency resources of the uplink subframe.

In some examples of the method 1400, the uplink subframe may be a multi-beam subframe, and the correspondence between the at least one receive beam and the at least one set of time-frequency resources may include a correspondence between a plurality of receive beams and a plurality of sets of time-frequency resources. In some examples, the time-frequency resource configuration may identify at least one of a first timing of a first LBT gap associated with more than one receive beam, a second timing of a second LBT gap associated with a single receive beam, a transmission start time associated with at least one of the plurality of receive beams, or a combination thereof.

In some examples of the method 1400, the uplink subframe may be a single-beam subframe, and the correspondence between the at least one receive beam and the at least one set of time-frequency resources may include a correspondence between a single receive beam and a single set of time-frequency resources. In some examples, the timing information for the uplink subframe may include an indication of a time window in which the uplink subframe is to be transmitted. In some examples, the method 1400 may further include receiving a trigger transmission on the receive beam during the time window, in which case the timing information for the uplink subframe may be relative to the trigger transmission.

Figure 15:
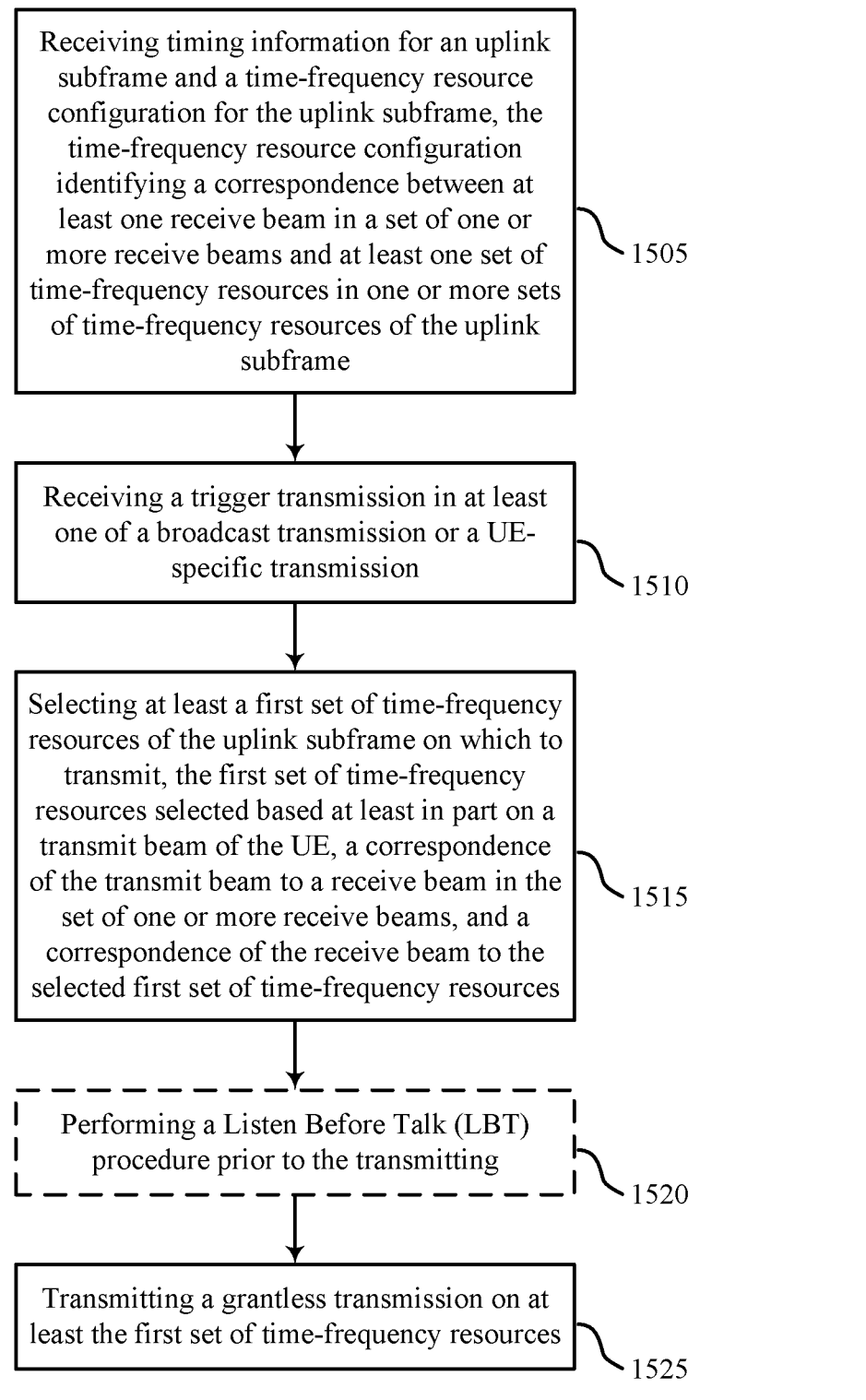

FIG. 15 is a flow chart illustrating an example of a method 1500 for wireless communication at a UE, in accordance with various aspects of the present disclosure. For clarity, the method 1500 is described below with reference to aspects of one or more of the UEs described with reference to FIG. 1, 2, or 12, aspects of the apparatus described with reference to FIG. 8, or aspects of one or more of the wireless communication managers described with reference to FIG. 8, 9, or 12. In some examples, a UE may execute one or more sets of codes to control the functional elements of the UE to perform the functions described below. Additionally or alternatively, the UE may perform one or more of the functions described below using special-purpose hardware.

At block 1505, the method 1500 may include receiving timing information for an uplink subframe and a time-frequency resource configuration for the uplink subframe, as described for example with reference to FIGS. 3-7. The time-frequency resource configuration may identify a correspondence between at least one receive beam in a set of one or more receive beams and at least one set of time-frequency resources in one or more sets of time-frequency resources of the uplink subframe. In some examples, receiving the timing information for the uplink subframe may include receiving an indication of a fixed timing of the uplink subframe, a first timing offset of the uplink subframe relative to a DRS transmission, or a second timing offset of the uplink subframe relative to a trigger transmission. In some examples, the operation(s) at block 1505 may be performed using the UL subframe timing and configuration manager described with reference to FIG. 8 or 9.

At block 1510, the method 1500 may include receiving the trigger transmission in at least one of a broadcast transmission or a UE-specific transmission, as described for example with reference to FIG. 3 or 7. In some examples, the trigger transmission may include at least a portion of the time-frequency resource configuration for the uplink subframe. In some examples, the operation(s) at block 1510 may be performed using the UL subframe trigger reception manager described with reference to FIG. 9.

At block 1515, the method 1500 may include selecting at least a first set of time-frequency resources of the uplink subframe on which to transmit, as described for example with reference to FIGS. 3-7. The first set of time-frequency resources may be selected based at least in part on a transmit beam of the UE, a correspondence of the transmit beam to a receive beam in the set of one or more receive beams, and a correspondence of the receive beam to the selected first set of time-frequency resources. In some examples, the operation(s) at block 1515 may be performed using the UL subframe resource selector described with reference to FIG. 8 or 9.

At block 1520, the method 1500 may optionally include performing a LBT procedure prior to the transmitting in block 1525, as described for example with reference to FIGS. 3-7. In some examples, the method 1500 may additionally or alternatively include determining, based at least in part on a transmission type, whether to perform a LBT procedure prior to the transmitting in block 1525. In some examples, the LBT procedure may be performed at least one of: for at least one beam direction and prior to all of the one or more sets of time-frequency resources corresponding to the one or more receive beams, for all of the beam directions and prior to all of the one or more sets of time-frequency resources corresponding to the one or more receive beams, or for at least the transmit beam or the receive beam and in a LBT gap prior to the first set of time-frequency resources. In some examples, the method 1500 may further include selecting a type of the LBT procedure based at least in part on a transmission type. In some examples, the operation(s) at block 1520 may be performed using the LBT manager described with reference to FIG. 9.

At block 1525, the method 1500 may include transmitting a grantless transmission on at least the first set of time-frequency resources, as described for example with reference to FIGS. 3-7. In some examples, the operation(s) at block 1525 may be performed using the grantless transmission manager described with reference to FIG. 8 or 9.

Figure 16:
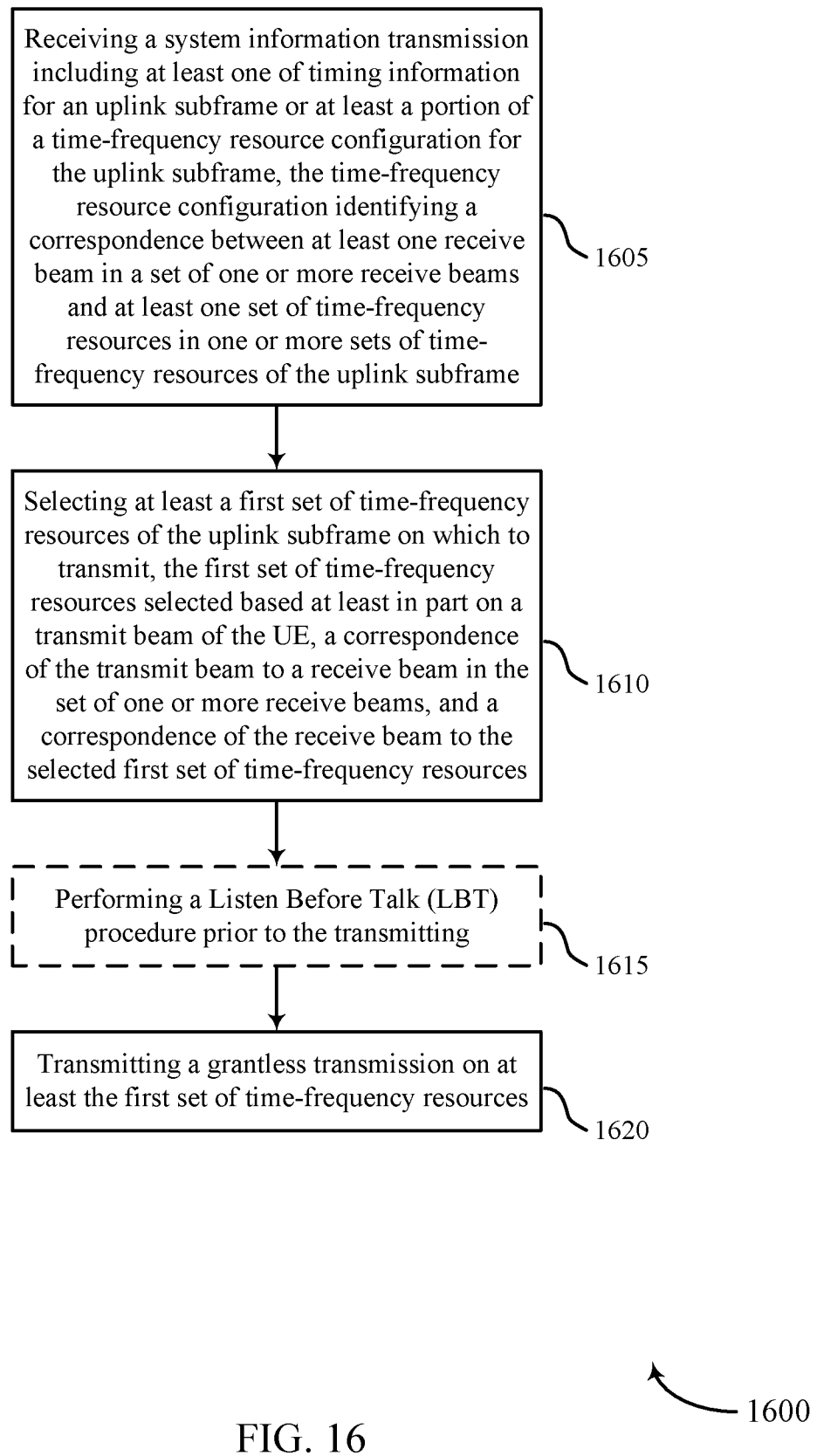

FIG. 16 is a flow chart illustrating an example of a method 1600 for wireless communication at a UE, in accordance with various aspects of the present disclosure. For clarity, the method 1600 is described below with reference to aspects of one or more of the UEs described with reference to FIG. 1, 2, or 12, aspects of the apparatus described with reference to FIG. 8, or aspects of one or more of the wireless communication managers described with reference to FIG. 8, 9, or 12. In some examples, a UE may execute one or more sets of codes to control the functional elements of the UE to perform the functions described below. Additionally or alternatively, the UE may perform one or more of the functions described below using special-purpose hardware.

At block 1605, the method 1600 may include receiving a system information transmission including at least one of timing information for an uplink subframe or at least a portion of a time-frequency resource configuration for the uplink subframe, as described for example with reference to FIGS. 3-7. The time-frequency resource configuration may identify a correspondence between at least one receive beam in a set of one or more receive beams and at least one set of time-frequency resources in one or more sets of time-frequency resources of the uplink subframe. In some examples, receiving the timing information for the uplink subframe may include receiving an indication of a fixed timing of the uplink subframe, a first timing offset of the uplink subframe relative to a DRS transmission, or a second timing offset of the uplink subframe relative to a trigger transmission. In some examples, the operation(s) at block 1605 may be performed using the UL subframe timing and configuration manager described with reference to FIG. 8 or 9.

At block 1610, the method 1600 may include selecting at least a first set of time-frequency resources of the uplink subframe on which to transmit, as described for example with reference to FIGS. 3-7. The first set of time-frequency resources may be selected based at least in part on a transmit beam of the UE, a correspondence of the transmit beam to a receive beam in the set of one or more receive beams, and a correspondence of the receive beam to the selected first set of time-frequency resources. In some examples, the operation(s) at block 1610 may be performed using the UL subframe resource selector described with reference to FIG. 8 or 9.

At block 1615, the method 1600 may optionally include performing a LBT procedure prior to the transmitting in block 1620, as described for example with reference to FIGS. 3-7. In some examples, the method 1600 may additionally or alternatively include determining, based at least in part on a transmission type, whether to perform a LBT procedure prior to the transmitting in block 1620. In some examples, the LBT procedure may be performed at least one of: for at least one beam direction and prior to all of the one or more sets of time-frequency resources corresponding to the one or more receive beams, for all of the beam directions and prior to all of the one or more sets of time-frequency resources corresponding to the one or more receive beams, or for at least the transmit beam or the receive beam and in a LBT gap prior to the first set of time-frequency resources. In some examples, the method 1400 may further include selecting a type of the LBT procedure based at least in part on a transmission type. In some examples, the operation(s) at block 1615 may be performed using the LBT manager described with reference to FIG. 9.

At block 1620, the method 1600 may include transmitting a grantless transmission on at least the first set of time-frequency resources, as described for example with reference to FIGS. 3-7. In some examples, the operation(s) at block 1620 may be performed using the grantless transmission manager described with reference to FIG. 8 or 9.

Figure 17:
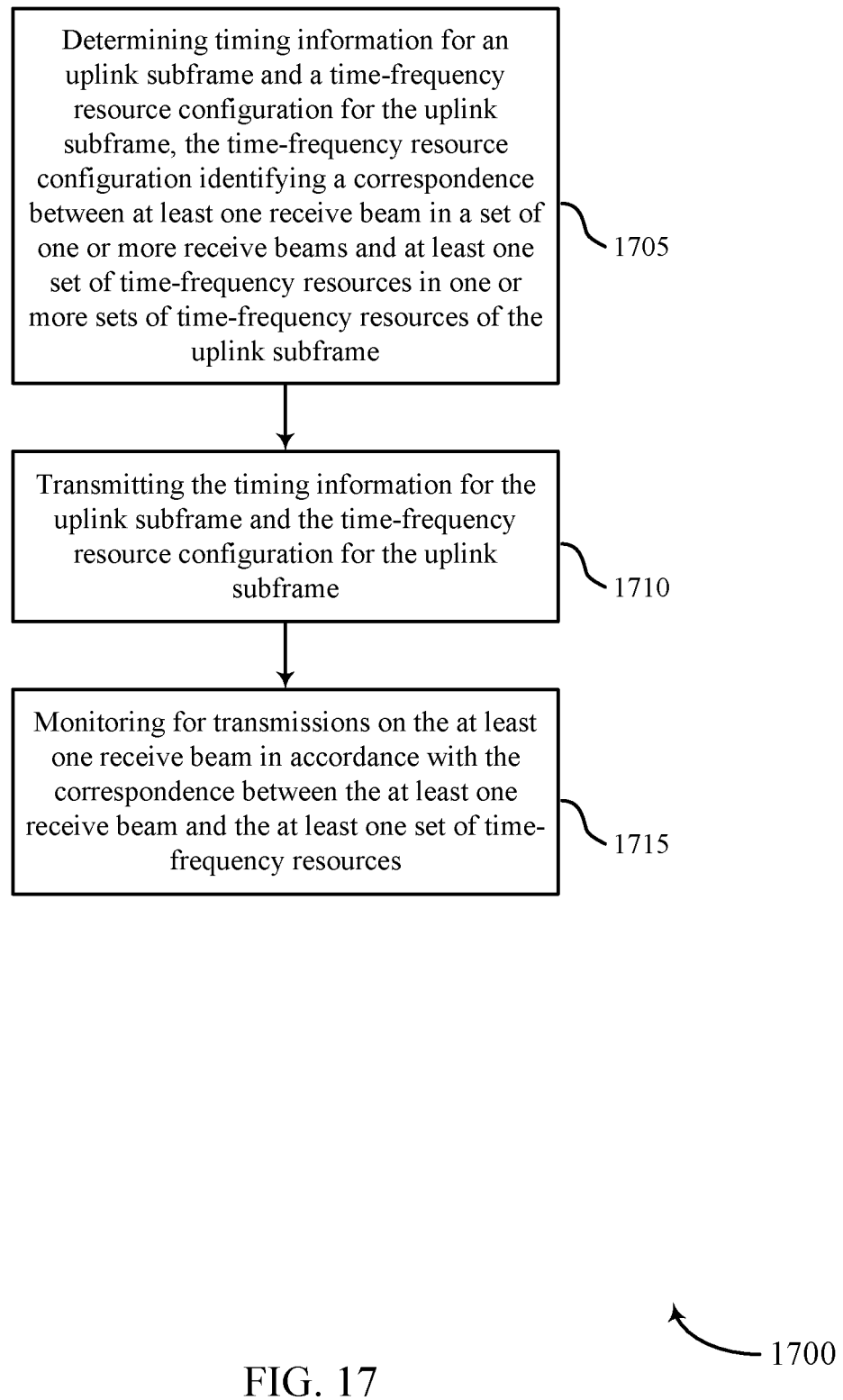
FIGS. 17-19 are flow charts illustrating examples of methods for wireless communication at a base station, in accordance with various aspects of the present disclosure.

FIG. 17 is a flow chart illustrating an example of a method 1700 for wireless communication at a base station, in accordance with various aspects of the present disclosure. For clarity, the method 1700 is described below with reference to aspects of one or more of the UEs described with reference to FIG. 1, 2, or 13, aspects of the apparatus described with reference to FIG. 10, or aspects of one or more of the wireless communication managers described with reference to FIG. 10, 11, or 13. In some examples, a base station may execute one or more sets of codes to control the functional elements of the base station to perform the functions described below. Additionally or alternatively, the base station may perform one or more of the functions described below using special-purpose hardware.

At block 1705, the method 1700 may include determining timing information for an uplink subframe and a time-frequency resource configuration for the uplink subframe, as described for example with reference to FIGS. 3-7. The time-frequency resource configuration may identify a correspondence between at least one receive beam in a set of one or more receive beams and at least one set of time-frequency resources in one or more sets of time-frequency resources of the uplink subframe. In some examples, the timing information for the uplink subframe may include an indication of a fixed timing of the uplink subframe, a first timing offset of the uplink subframe relative to a DRS transmission, or a second timing offset of the uplink subframe relative to a trigger transmission. In some examples, the operation(s) at block 1705 may be performed using the UL subframe timing and configuration determiner described with reference to FIG. 10 or 11.

At block 1710, the method 1700 may include transmitting the timing information for the uplink subframe and the time-frequency resource configuration for the uplink subframe, as described for example with reference to FIGS. 3-7. In some examples, the operation(s) at block 1710 may be performed using the UL subframe timing and configuration transmission manager described with reference to FIG. 10 or 11.

At block 1715, the method 1700 may include monitoring for transmissions on the at least one receive beam in accordance with the correspondence between the at least one receive beam and the at least one set of time-frequency resources, as described for example with reference to FIGS. 3-7. In some examples, the operation(s) at block 1715 may be performed using the grantless transmission reception monitor described with reference to FIG. 10 or 11.

In some examples of the method 1700, the time-frequency resource configuration for the uplink subframe may further identify a correspondence between at least one transmission type and the at least one set of time-frequency resources in the one or more sets of time-frequency resources of the uplink subframe. In some examples, the at least one transmission type may include at least one of an ACK/NACK transmission type, a random access transmission type, a CQI transmission type, a SR transmission type, a SRS transmission type, a grantless PUSCH transmission type, or a combination thereof. In some examples, the correspondence between the at least one transmission type and the at least one set of time-frequency resources may be based at least in part on a first allocation of different bandwidths to different transmission types, a second allocation of different CDM codes to different transmission types, a third allocation of different OCCs to different transmission types, or a combination thereof.

In some examples of the method 1700, the time-frequency resource configuration for the uplink subframe may further identify a correspondence between at least one UE and the at least one set of time-frequency resources in one or more sets of time-frequency resources of the uplink subframe.

In some examples of the method 1700, the time-frequency resource configuration for the uplink subframe may further include a first LBT gap allocated for at least one beam direction and located prior to all of the one or more sets of time-frequency resources corresponding to the one or more receive beams, a second LBT gap allocated for all of the beam directions and located prior to all of the one or more sets of time-frequency resources corresponding to the one or more receive beams, or a third LBT gap allocated for a single beam direction and located prior to a set of time-frequency resources corresponding to the single beam direction.

In some examples of the method 1700, the uplink subframe may include a multi-beam subframe, and the correspondence between the at least one receive beam and the at least one set of time-frequency resources may include a correspondence between a plurality of receive beams and a plurality of sets of time-frequency resources. In some examples, the time-frequency resource configuration may identify at least one of a first timing of a first LBT gap associated with more than one receive beam, a second timing of a second LBT gap associated with a single receive beam, a transmission start time associated with at least one of the plurality of receive beams, or a combination thereof.

In some examples of the method 1700, the uplink subframe may include a single-beam subframe, and the correspondence between the at least one receive beam and the at least one set of time-frequency resources may include a correspondence between a single receive beam and a single set of time-frequency resources. In some examples, the timing information for the uplink subframe may include an indication of a time window in which the uplink subframe is to be transmitted. In some examples, the method 1700 may include transmitting a trigger transmission on a receive beam during the time window, with the timing information for the uplink subframe being relative to the trigger transmission.

Figure 18:
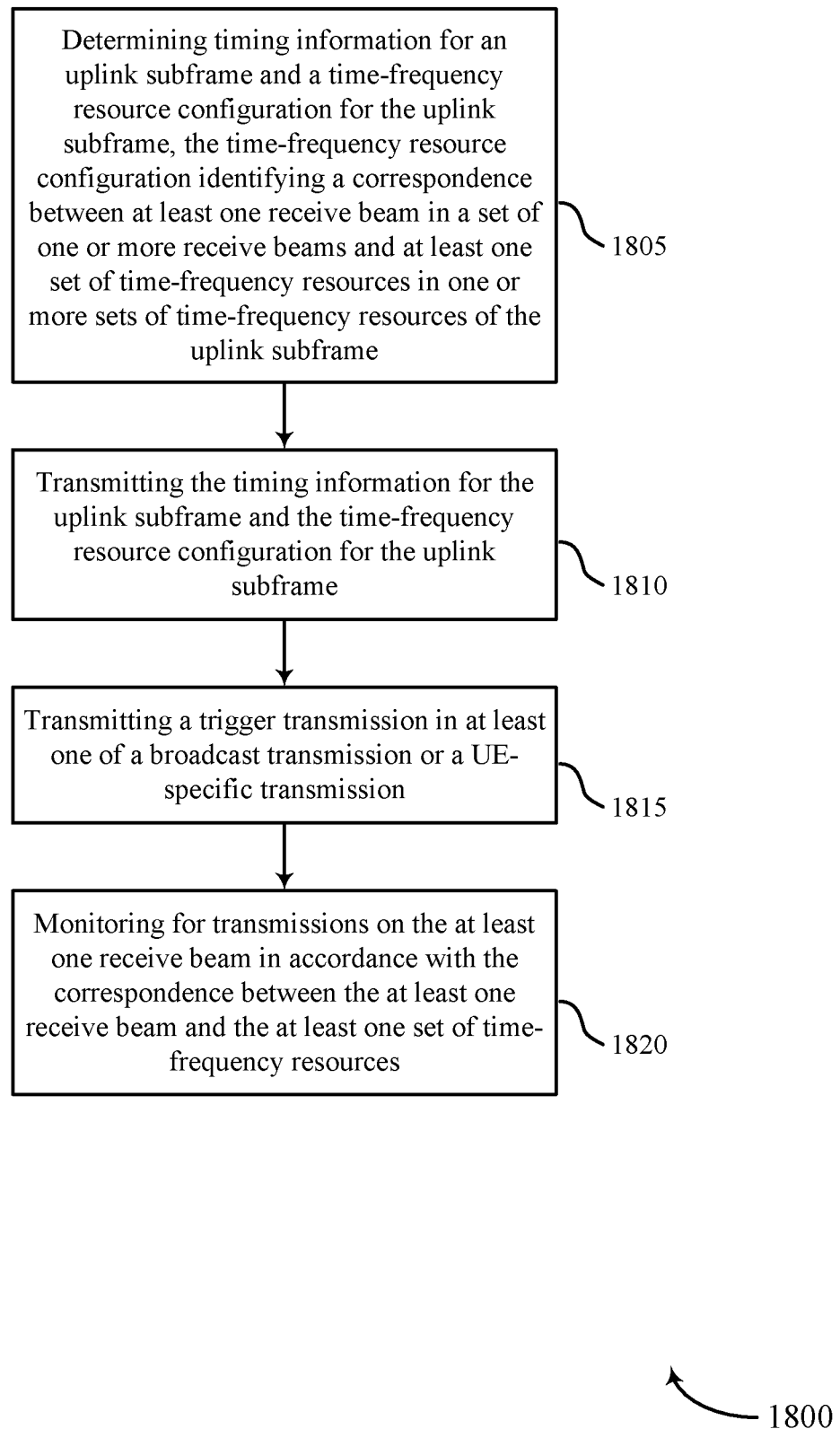

FIG. 18 is a flow chart illustrating an example of a method 1800 for wireless communication at a base station, in accordance with various aspects of the present disclosure. For clarity, the method 1800 is described below with reference to aspects of one or more of the UEs described with reference to FIG. 1, 2, or 13, aspects of the apparatus described with reference to FIG. 10, or aspects of one or more of the wireless communication managers described with reference to FIG. 10, 11, or 13. In some examples, a base station may execute one or more sets of codes to control the functional elements of the base station to perform the functions described below. Additionally or alternatively, the base station may perform one or more of the functions described below using special-purpose hardware.

At block 1805, the method 1800 may include determining timing information for an uplink subframe and a time-frequency resource configuration for the uplink subframe, as described for example with reference to FIGS. 3-7. The time-frequency resource configuration may identify a correspondence between at least one receive beam in a set of one or more receive beams and at least one set of time-frequency resources in one or more sets of time-frequency resources of the uplink subframe. In some examples, the timing information for the uplink subframe may include an indication of a fixed timing of the uplink subframe, a first timing offset of the uplink subframe relative to a DRS transmission, or a second timing offset of the uplink subframe relative to a trigger transmission. In some examples, the operation(s) at block 1805 may be performed using the UL subframe timing and configuration determiner described with reference to FIG. 10 or 11.

At block 1810, the method 1800 may include transmitting the timing information for the uplink subframe and the time-frequency resource configuration for the uplink subframe, as described for example with reference to FIGS. 3-7. In some examples, the operation(s) at block 1810 may be performed using the UL subframe timing and configuration transmission manager described with reference to FIG. 10 or 11.

At block 1815, the method 1800 may include transmitting the trigger transmission in at least one of a broadcast transmission or a UE-specific transmission, as described for example with reference to FIG. 3 or 7. In some examples, the trigger transmission may include at least a portion of the time-frequency resource configuration for the uplink subframe. In some examples, the operation(s) at block 1815 may be performed using the trigger manager described with reference to FIG. 11.

At block 1820, the method 1800 may include monitoring for transmissions on the at least one receive beam in accordance with the correspondence between the at least one receive beam and the at least one set of time-frequency resources, as described for example with reference to FIGS. 3-7. In some examples, the operation(s) at block 1820 may be performed using the grantless transmission reception monitor described with reference to FIG. 10 or 11.

Figure 19:
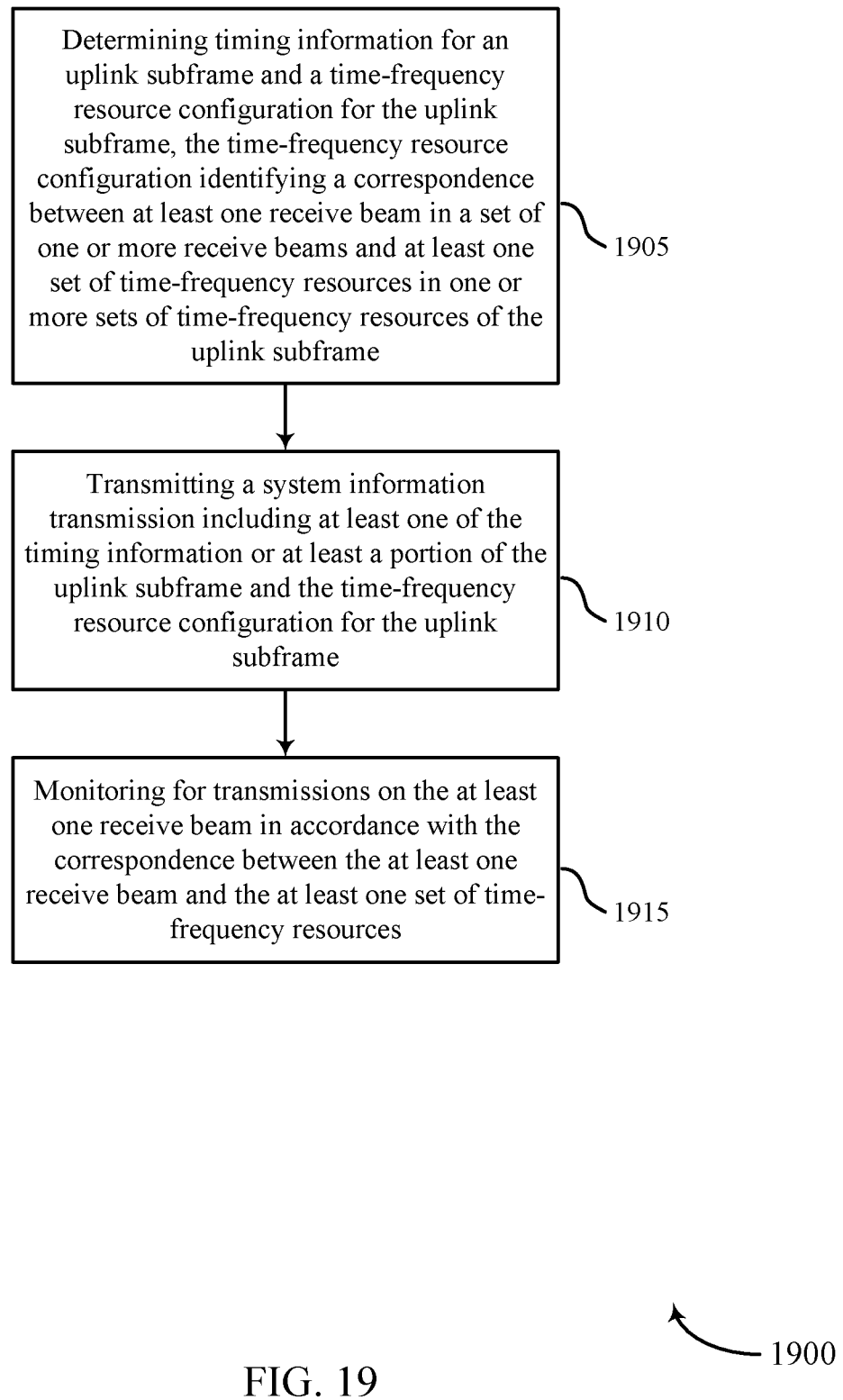

FIG. 19 is a flow chart illustrating an example of a method 1900 for wireless communication at a base station, in accordance with various aspects of the present disclosure. For clarity, the method 1900 is described below with reference to aspects of one or more of the UEs described with reference to FIG. 1, 2, or 13, aspects of the apparatus described with reference to FIG. 10, or aspects of one or more of the wireless communication managers described with reference to FIG. 10, 11, or 13. In some examples, a base station may execute one or more sets of codes to control the functional elements of the base station to perform the functions described below. Additionally or alternatively, the base station may perform one or more of the functions described below using special-purpose hardware.

At block 1905, the method 1900 may include determining timing information for an uplink subframe and a time-frequency resource configuration for the uplink subframe, as described for example with reference to FIGS. 3-7. The time-frequency resource configuration may identify a correspondence between at least one receive beam in a set of one or more receive beams and at least one set of time-frequency resources in one or more sets of time-frequency resources of the uplink subframe. In some examples, the timing information for the uplink subframe may include an indication of a fixed timing of the uplink subframe, a first timing offset of the uplink subframe relative to a DRS transmission, or a second timing offset of the uplink subframe relative to a trigger transmission. In some examples, the operation(s) at block 1905 may be performed using the UL subframe timing and configuration determiner described with reference to FIG. 10 or 11.

At block 1910, the method 1900 may include transmitting a system information transmission including at least one of the timing information for the uplink subframe or at least a portion of the time-frequency resource configuration for the uplink subframe, as described for example with reference to FIGS. 3-7. In some examples, the operation(s) at block 1910 may be performed using the UL subframe timing and configuration transmission manager described with reference to FIG. 10 or 11.

At block 1915, the method 1900 may include monitoring for transmissions on the at least one receive beam in accordance with the correspondence between the at least one receive beam and the at least one set of time-frequency resources, as described for example with reference to FIGS. 3-7. In some examples, the operation(s) at block 1915 may be performed using the grantless transmission reception monitor described with reference to FIG. 10 or 11.

The methods 1400, 1500, 1600, 1700, 1800, and 1900 described with reference to FIGS. 14, 15, 16, 17, 18, and 19 may provide for wireless communication. It should be noted that the methods 1400, 1500, 1600, 1700, 1800, and 1900 are example implementations of some of the techniques described in the present disclosure, and the operations of methods 1400, 1500, 1600, 1700, 1800, and 1900 may be rearranged, combined with other operations of the same or different method, or otherwise modified, such that other implementations are possible. Operations may also be added to the methods 1400, 1500, 1600, 1700, 1800, and 1900.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a user equipment (UE), comprising:
   receiving timing information for an uplink subframe and a time-frequency resource configuration for the uplink subframe, the timing information indicating when to transmit over the uplink subframe, the time-frequency resource configuration identifying a correspondence between at least one receive beam in a set of one or more receive beams and at least one set of time-frequency resources in one or more sets of time-frequency resources of the uplink subframe;
   identifying a transmit beam of the UE to use for transmitting a grantless transmission:
   selecting at least a first set of time-frequency resources of the uplink subframe on which to transmit, the first set of time-frequency resources selected based at least in part on the identified transmit beam of the UE using a correspondence of the identified transmit beam of the UE to a receive beam in the set of one or more receive beams, and a correspondence of the receive beam to the selected first set of time-frequency resources; and
   transmitting, according to the received timing information for the uplink subframe, the grantless transmission on at least the selected first set of time-frequency resources.

2. The method of claim 1, wherein receiving the timing information for the uplink subframe comprises:
   receiving an indication of: a fixed timing of the uplink subframe, a first timing offset of the uplink subframe relative to a discovery reference signal (DRS) transmission, or a second timing offset of the uplink subframe relative to a trigger transmission that triggers the transmitting of the grantless transmission.

3. The method of claim 2, further comprising:
   receiving the trigger transmission in at least one of: a broadcast transmission or a UE-specific transmission.

4. The method of claim 1, further comprising:
   receiving a system information transmission comprising at least one of: at least a portion of the timing information for the uplink subframe, at least a portion of the time-frequency resource configuration for the uplink subframe, or a combination thereof.

5. The method of claim 1, wherein the time-frequency resource configuration for the uplink subframe further identifies a correspondence between at least one transmission type and the at least one set of time-frequency resources in the one or more sets of time-frequency resources of the uplink subframe.

6. The method of claim 5, wherein the first set of time-frequency resources of the uplink subframe is further selected based at least in part on a first transmission type of the UE, and on a correspondence between the first transmission type and the first set of time-frequency resources of the uplink subframe.

7. The method of claim 5, wherein the at least one transmission type comprises at least one of: an acknowledgement/non-acknowledgement (ACK/NACK) transmission type, a random access transmission type, a channel quality information (CQI) transmission type, a scheduling request (SR) transmission type, a sounding reference signal (SRS) transmission type, a grantless physical uplink shared channel (PUSCH) transmission type, or a combination thereof.

8. The method of claim 5, wherein the correspondence between the at least one transmission type and the at least one set of time-frequency resources is based at least in part on: a first pre-allocation of different bandwidths to different transmission types, a second pre-allocation of different code division multiplexing (CDM) codes to different transmission types, a third pre-allocation of different orthogonal cover codes (OCCs) to different transmission types, or a combination thereof.

9. The method of claim 1, wherein the time-frequency resource configuration for the uplink subframe further identifies a correspondence between at least one UE and the at least one set of time-frequency resources in one or more sets of time-frequency resources of the uplink subframe.

10. The method of claim 9, wherein the first set of time-frequency resources of the uplink subframe is further selected based at least in part on the UE, and on a correspondence between the UE and the first set of time-frequency resources of the uplink subframe.

11. The method of claim 1, further comprising:
performing a Listen Before Talk (LBT) procedure prior to the transmitting.

12. The method of claim 11, wherein the LBT procedure is performed at least one of: for at least one beam direction and prior to all of the one or more sets of time-frequency resources corresponding to the one or more receive beams, for all beam directions and prior to all of the one or more sets of time-frequency resources corresponding to the one or more receive beams, or for at least the transmit beam or the receive beam and in a LBT gap prior to the first set of time-frequency resources.

13. The method of claim 11, further comprising:
selecting a type of the LBT procedure based at least in part on a transmission type.

14. The method of claim 1, further comprising:
determining, based at least in part on a transmission type, whether to perform a LBT procedure prior to the transmitting.

15. The method of claim 1, wherein the time-frequency resource configuration identifies at least one of: a first timing of a first Listen Before Talk (LBT) gap associated with more than one receive beam, a second timing of a second LBT gap associated with a single receive beam, a transmission start time associated with at least one of the plurality of receive beams, or a combination thereof.

16. The method of claim 1, wherein the timing information for the uplink subframe comprises an indication of a time window in which the uplink subframe is to be transmitted.

17. The method of claim 16, further comprising:
receiving, during the time window, a trigger transmission that triggers the transmitting of the grantless transmission;
wherein the timing information for the uplink subframe is relative to the trigger transmission.

18. An apparatus for wireless communication at a user equipment (UE), comprising:
a processor;
memory in electronic communication with the processor; and
instructions stored in the memory, wherein the instructions are executable by the processor to:
receive timing information for an uplink subframe and a time-frequency resource configuration for the uplink subframe, the timing information indicating when to transmit over the uplink subframe, the time-frequency resource configuration identifying a correspondence between at least one receive beam in a set of one or more receive beams and at least one set of time-frequency resources in one or more sets of time-frequency resources of the uplink subframe;
identify a transmit beam of the UE to use for transmitting a grantless transmission;
select at least a first set of time-frequency resources of the uplink subframe on which to transmit, the first set of time-frequency resources selected based at least in part on the identified transmit beam of the UE using a correspondence of the identified transmit beam of the UE to a receive beam in the set of one or more receive beams, and a correspondence of the receive beam to the selected first set of time-frequency resources; and
transmit, according to the received timing information for the uplink subframe, the grantless transmission on at least the selected first set of time-frequency resources.

19. A method for wireless communication at a base station, comprising:
determining timing information for an uplink subframe and a time-frequency resource configuration for the uplink subframe, the timing information indicating when to transmit over the uplink subframe, the time-frequency resource configuration identifying a correspondence between at least one receive beam in a set of one or more receive beams and at least one set of time-frequency resources in one or more sets of time-frequency resources of the uplink subframe;
transmitting the timing information for the uplink subframe and the time-frequency resource configuration for the uplink subframe, the timing information comprising an indication of a timing offset of the uplink subframe relative to a trigger transmission that triggers transmitting of a grantless transmission by a user equipment (UE) on the at least one receive beam;
transmitting the trigger transmission to trigger transmitting of the grantless transmission by the UE; and
monitoring for transmissions on the at least one receive beam in accordance with the correspondence between the at least one receive beam and the at least one set of time-frequency resources.

20. The method of claim 19, wherein the trigger transmission is transmitted in at least one of a broadcast transmission or a UE-specific transmission.

21. The method of claim 19, further comprising: transmitting a system information transmission comprising at least one of: at least a portion of the timing information for the uplink subframe, at least a portion of the time-frequency resource configuration for the uplink subframe, or a combination thereof.

22. The method of claim 19, wherein the time-frequency resource configuration for the uplink subframe further identifies a correspondence between at least one transmission type and the at least one set of time-frequency resources in the one or more sets of time-frequency resources of the uplink subframe.

23. The method of claim 22, wherein the at least one transmission type comprises at least one of: an acknowledgement/non-acknowledgement (ACK/NACK) transmission type, a random access transmission type, a channel quality information (CQI) transmission type, a scheduling request (SR) transmission type, a sounding reference signal (SRS) transmission type, a grantless physical uplink shared channel (PUSCH) transmission type, or a combination thereof.

24. The method of claim 19, wherein the time-frequency resource configuration for the uplink subframe further identifies a correspondence between at least one UE and the at least one set of time-frequency resources in one or more sets of time-frequency resources of the uplink subframe.

25. The method of claim 19, wherein the time-frequency resource configuration for the uplink subframe further comprises: a first Listen Before Talk (LBT) gap allocated for at least one beam direction and located prior to all of the one or more sets of time-frequency resources corresponding to the one or more receive beams, a second LBT gap allocated for all beam directions and located prior to all of the one or more sets of time-frequency resources corresponding to the one or more receive beams, or a third LBT gap allocated for a single beam direction and located prior to a set of time-frequency resources corresponding to the single beam direction.

26. The method of claim 19, wherein the time-frequency resource configuration identifies at least one of: a first timing of a first Listen Before Talk (LBT) gap associated with more than one receive beam, a second timing of a second LBT gap associated with a single receive beam, a transmission start time associated with at least one of the plurality of receive beams, or a combination thereof.

27. The method of claim 19, wherein the timing information for the uplink subframe comprises an indication of a time window in which the uplink subframe is to be transmitted.

28. The method of claim 27, further comprising:
transmitting the trigger transmission during the time window;
wherein the timing information for the uplink subframe is relative to the trigger transmission.

29. An apparatus for wireless communication at a base station, comprising:
a processor;
memory in electronic communication with the processor; and
instructions stored in the memory, wherein the instructions are executable by the processor to:
determine timing information for an uplink subframe and a time-frequency resource configuration for the uplink subframe, the timing information indicating when to transmit over the uplink subframe, the time-frequency resource configuration identifying a correspondence between at least one receive beam in a set of one or more receive beams and at least one set of time-frequency resources in one or more sets of time-frequency resources of the uplink subframe;
transmit the timing information for the uplink subframe and the time-frequency resource configuration for the uplink subframe, the timing information comprising an indication of a timing offset of the uplink subframe relative to a trigger transmission that triggers transmitting of a grantless transmission by a user equipment (UE) on the at least one receive beam;
transmit the trigger transmission to trigger transmitting by the UE; and
monitor for transmissions on the at least one receive beam in accordance with the correspondence between the at least one receive beam and the at least one set of time-frequency resources.

30. The method of claim 2, wherein at least a portion of the timing information for the uplink subframe, at least a portion of the time-frequency resource configuration for the uplink subframe, or a combination thereof, is received via the trigger transmission.

31. The method of claim 19, wherein at least a portion of the timing information for the uplink subframe, at least a portion of the time-frequency resource configuration for the uplink subframe, or a combination thereof, is transmitted via the trigger transmission.

32. The apparatus of claim 29, wherein the instructions are further executable by the processor to:
transmit the trigger transmission in at least one of: a broadcast transmission or a UE-specific transmission.

33. The apparatus of claim 29, wherein at least a portion of the timing information for the uplink subframe, at least a portion of the time-frequency resource configuration for the uplink subframe, or a combination thereof, is transmitted via the trigger transmission.

* * * * *